(12) United States Patent
Ahn et al.

(10) Patent No.: US 12,461,564 B2
(45) Date of Patent: Nov. 4, 2025

(54) DISPLAY APPARATUS

(71) Applicant: Samsung Display Co., LTD., Yongin-si (KR)

(72) Inventors: Jaeho Ahn, Yongin-si (KR); Beomjin Kim, Yongin-si (KR); Taewoong Kim, Yongin-si (KR); Sangjun Lee, Yongin-si (KR); Jin Hwan Choi, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 268 days.

(21) Appl. No.: 18/139,002

(22) Filed: Apr. 25, 2023

(65) Prior Publication Data
US 2023/0359245 A1    Nov. 9, 2023

(30) Foreign Application Priority Data

May 4, 2022    (KR) .................. 10-2022-0055676

(51) Int. Cl.
*G06F 1/16*    (2006.01)
(52) U.S. Cl.
CPC .......... *G06F 1/1652* (2013.01); *G06F 1/1656* (2013.01)
(58) Field of Classification Search
CPC ...... G06F 1/1652; G06F 1/1656; G09F 9/301; H05K 5/0017; H01L 51/56
See application file for complete search history.

(56) References Cited

U.S. PATENT DOCUMENTS

| | | | |
|---|---|---|---|
| 9,560,750 B2 | 1/2017 | Lee | |
| 10,877,525 B2 | 12/2020 | Kang et al. | |
| 11,172,583 B2 | 11/2021 | Lee et al. | |
| 11,272,626 B2 | 3/2022 | Lee et al. | |
| 2017/0344073 A1* | 11/2017 | Kang | G06F 1/1679 |
| 2020/0214149 A1* | 7/2020 | Lee | H05K 1/148 |
| 2023/0004189 A1* | 1/2023 | Luo | G06F 1/1652 |
| 2023/0049246 A1* | 2/2023 | Wang | H10K 77/111 |
| 2023/0217610 A1* | 7/2023 | Lee | G06F 1/1652 |
| | | | 361/807 |
| 2024/0225318 A9* | 7/2024 | Korn | A47G 5/02 |

FOREIGN PATENT DOCUMENTS

| | | |
|---|---|---|
| KR | 1020170136060 A | 12/2017 |
| KR | 1020200080665 A | 7/2020 |
| KR | 1020210017058 A | 2/2021 |
| KR | 102269135 B1 | 6/2021 |

* cited by examiner

*Primary Examiner* — Allen L Parker
*Assistant Examiner* — Peter Krim
(74) *Attorney, Agent, or Firm* — CANTOR COLBURN LLP

(57) ABSTRACT

A display apparatus includes a first roller and a second roller each rolling about a rolling axis extending along a first direction and spaced apart from each other in a second direction crossing the first direction, a display panel connected to the first roller, and a support connected to the second roller and disposed on a rear surface of the display panel to support the display panel. A hole passing through the support is defined in the support, the support includes an end part surrounding a portion of the hole and extending along the first direction and a side part extending along the second direction from the end part, and the end part is convex toward the display panel in a cross section.

15 Claims, 17 Drawing Sheets

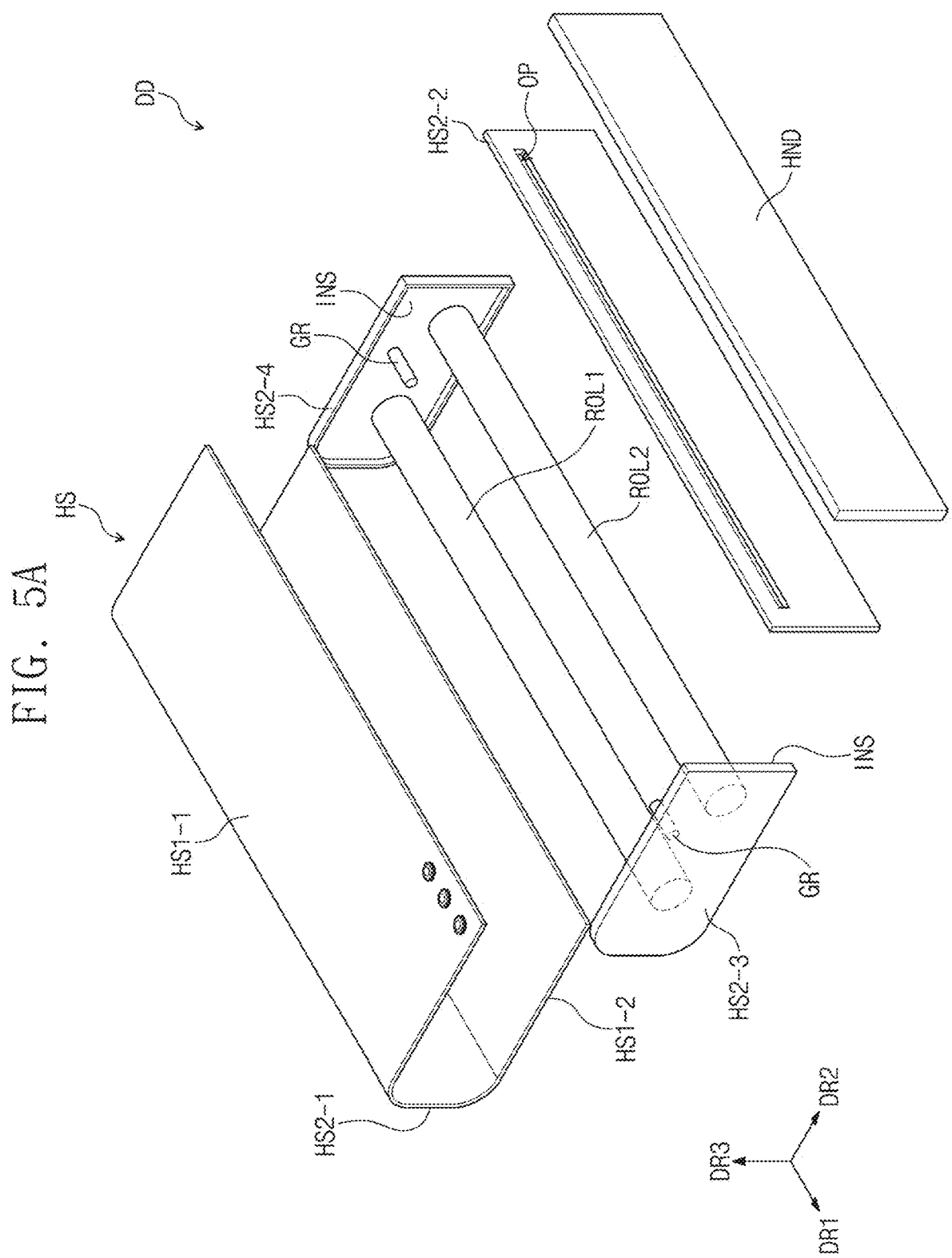

DISPLAY APPARATUS

This application claims priority to Korean Patent Application No. 10-2022-0055676, filed on May 4, 2022, and all the benefits accruing therefrom under 35 U.S.C. § 119, the content of which in its entirety is herein incorporated by reference.

BACKGROUND

1. Field

The disclosure herein relates to a display apparatus and, more specifically, to a rollable display apparatus.

2. Description of the Related Art

Electronic equipment that provides an image to a user, such as a smart phone, a digital camera, a laptop computer, a navigation unit, and a smart television includes display apparatuses for displaying the image. Recently, with the technological development of a display apparatus, various types of display apparatuses are being developed. Various flexible display apparatuses, which are deformable in a curved shape, foldable, or rollable, for example, are being developed. Since the flexible display apparatuses are easy to carry, the convenience of a user who uses the flexible display apparatuses may be improved.

A rollable display apparatus may include a display panel that may be wound or unwound as desired and a support for supporting the display panel. In a rollable display apparatus, it is desired to study a support that may be wound and accommodated together with the display panel when the display panel is wound and that may support the unfolded display panel when the display panel is unwound.

SUMMARY

The disclosure provides a rollable display apparatus including a support that supports a display panel and has a minimized dead space.

An embodiment of the inventive concept provides a display apparatus including a first roller and a second roller each rolling about a rolling axis extending along a first direction and spaced apart from each other in a second direction crossing the first direction, a display panel connected to the first roller, and a support connected to the second roller and disposed on a rear surface of the display panel to support the display panel. In an embodiment, a hole passing through the support may be defined in the support, the support may include an end part surrounding a portion of the hole and extending along the first direction and a side part extending along the second direction from the end part, and the end part may be convex toward the display panel in a cross section.

In an embodiment, a length of the hole in the second direction may be about 30% or less of a length of the support in the second direction.

In an embodiment, the length of the hole in the second direction may be greater than a width of the hole in the first direction.

In an embodiment, the hole may be provided in plural, and a plurality of holes may be spaced apart from each other along the second direction.

In an embodiment, a sum of lengths of the plurality of holes in the second direction may be about 30% or less of a length of the support in the second direction.

In an embodiment, a sum of lengths of the plurality of holes in the second direction may be greater than a width of each of the plurality of holes in the first direction.

In an embodiment, the hole may be provided in plural, and a plurality of holes may be spaced apart from each other along the first direction.

In an embodiment, a length of each of the plurality of holes in the second direction may be greater than a sum of widths of the plurality of holes in the first direction.

In an embodiment, the hole may have a circular, oval, or quadrangular shape in a plan view.

In an embodiment, in a state in which the display panel may be wound on the first roller, the end part may support the display panel, and at least a portion of the side part may be wound on the second roller.

In an embodiment, in a state in which the display panel may be unwound from the first roller, the support may support an unwound portion of the display panel.

In an embodiment, the support may be a bistable reeled composite.

In an embodiment, the support may be provided in plural, and a plurality of supports may be spaced apart from each other along the first direction.

In an embodiment, a rotation direction of the first roller that unwinds the display panel and a rotation direction of the second roller that unwinds the support may be opposed to each other.

In an embodiment of the inventive concept, a display apparatus includes a display panel rolled about a first rolling axis extending along a first direction, and a support rolled about a second rolling axis extending along the first direction and spaced apart from the first rolling axis, In an embodiment, a hole passing through the support may be defined in the support, the hole may be adjacent to an end of the support extending along the first direction, and the support may be a bistable reeled composite.

In an embodiment, a first portion of the support wound about the second rolling axis may be flat along the first direction, and a second portion of the support that is unwound about the second rolling axis and extends along a second direction crossing the first direction may be convex toward the display panel.

In an embodiment, a length of the hole in the second direction may be greater than a width of the hole in the first direction.

In an embodiment, a length of the hole in the second direction may be about 30% or less of a length of the support in the second direction.

In an embodiment, the hole may be provided in plural, and a plurality of holes may be spaced apart from each other along a second direction crossing the first direction.

In an embodiment, a rotation direction of the display panel rolled about the first rolling axis and a rotation direction of the support rolled about the second rolling axis may be opposed to each other.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIGS. 5A and 5B are perspective views of an embodiment of some components of a display apparatus according to the inventive concept;

DETAILED DESCRIPTION

Figure 1A:
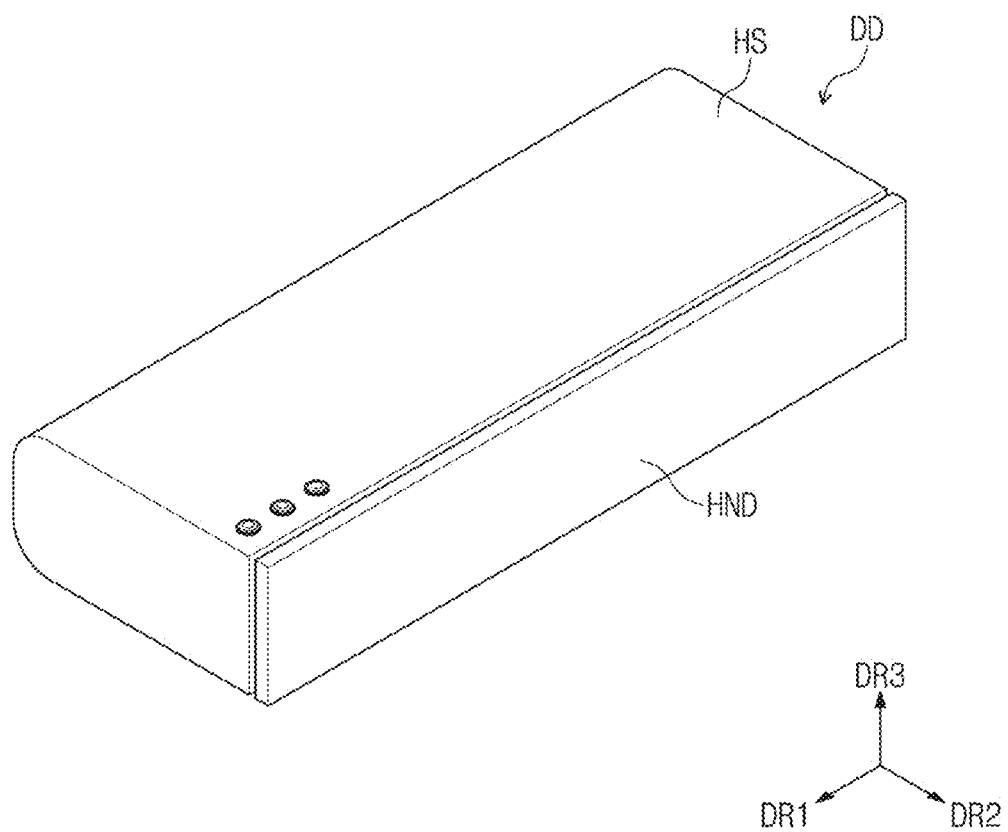
FIGS. 1A and 1B are perspective views of an embodiment of a display apparatus according to the inventive concept.

Embodiments of the disclosure may be implemented in various modifications and have various forms and illustrative embodiments are illustrated in the drawings and described in detail in the text. It is to be understood, however, that the invention is not intended to be limited to the particular forms disclosed, but on the contrary, is intended to cover all modifications, equivalents, and alternatives falling within the spirit and scope of the invention.

It will be understood that when an element (or a region, a layer, a portion, or the like) is referred to as "being on", "connected to" or "coupled to" another element, it can be directly disposed on, connected or coupled to the other element, or intervening elements may be disposed therebetween.

Like numbers or symbols refer to like elements throughout. Also, in the drawings, the thicknesses, ratios, and dimensions of the elements are exaggerated for effective description of the technical contents. The term "and/or" includes all of one or more combinations which can be defined by related elements.

Although the terms first, second, etc., may be used to describe various elements, these elements should not be limited by these terms. These terms are only used to distinguish one element from another element. For example, a first element may be referred to as a second element, and similarly, a second element may also be referred to as a first element without departing from the scope of the disclosure. The singular forms include the plural forms as well, unless the context clearly indicates otherwise.

Also, terms of "below", "on lower side", "above", "on upper side", or the like may be used to describe the relationships of the elements illustrated in the drawings. These terms have relative concepts and are described on the basis of the directions indicated in the drawings.

It will be understood that the term "includes" or "comprises", when used in this specification, specifies the presence of stated features, integers, steps, operations, elements, components, or a combination thereof, but does not preclude the presence or addition of one or more other features, integers, steps, operations, elements, components, or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which the disclosure belongs. Also, terms, such as those defined in commonly used dictionaries, should be interpreted as having a meaning that is consistent with their meaning in the context of the relevant art and should not be interpreted in an idealized or overly formal sense unless expressly so defined herein.

Hereinafter, a display apparatus in an embodiment of the inventive concept will be described with reference to the drawings.

Figure 1B:
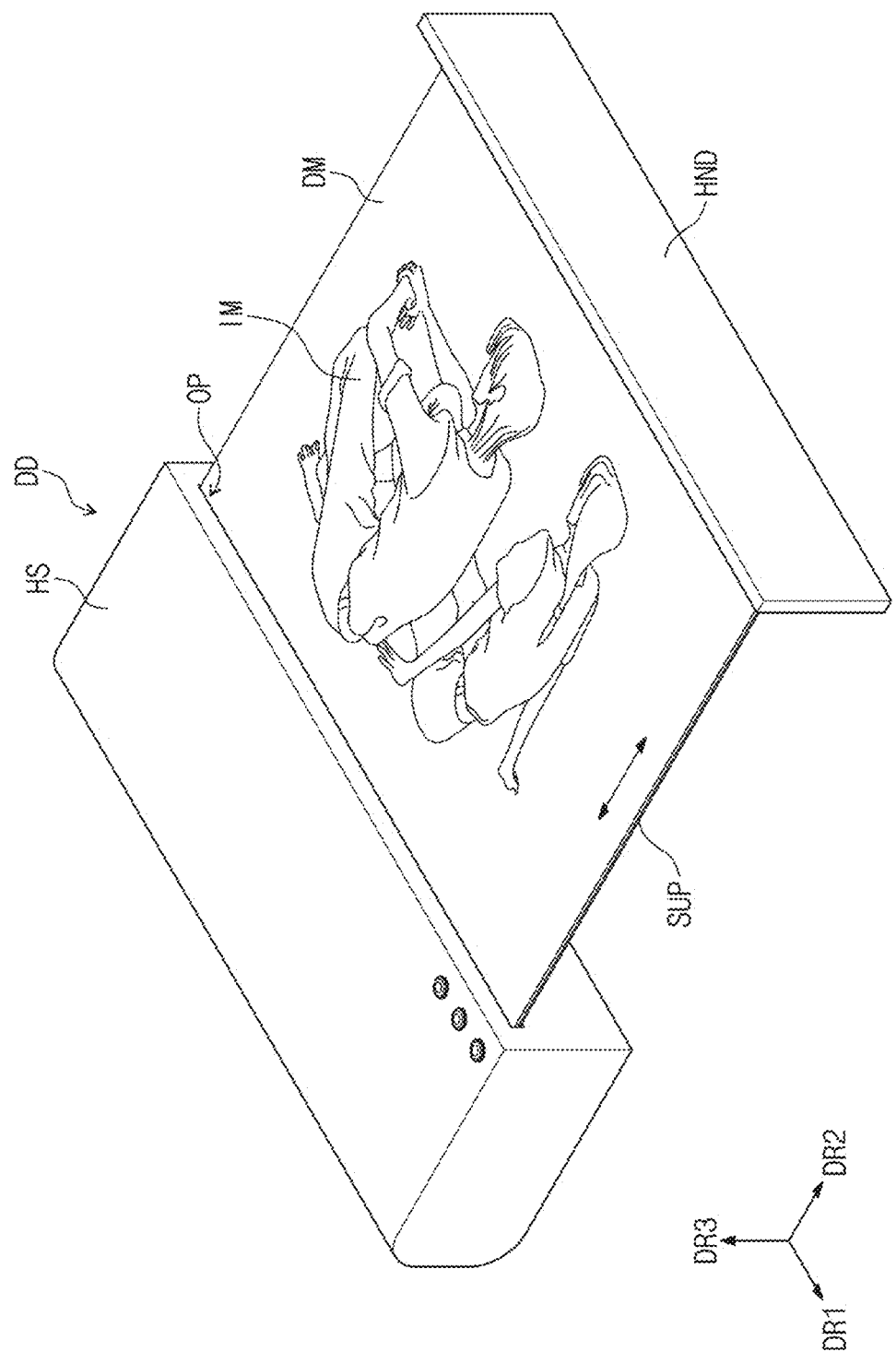

FIGS. 1A and 1B are perspective views of an embodiment of a display apparatus. Referring to FIGS. 1A and 1B, a display apparatus DD may include a housing HS, a handle HND, a display module DM, and a support SUP.

FIG. 1A illustrates a state in which the display module DM (refer to FIG. 1B) of the display apparatus DD is wound (or rolled) and accommodated in the housing HS, and FIG. 1B illustrates a state in which the display module DM of the display apparatus DD is unwound (or unrolled) to an outside of the housing HS.

The display apparatus DD may be an apparatus that is activated in response to an electrical signal and may display an image. In an embodiment, the display apparatus DD may be included in not only a large-sized display apparatus such as a television or an external billboard, but also a small- and medium-sized display apparatus such as a monitor, a mobile phone, a tablet computer, a navigation system, and a game console, for example. However, the display apparatus DD of the disclosure is not limited to the above embodiments as long as they do not depart from the idea of the inventive concept.

In this specification, a first direction DR1, a second direction DR2 crossing the first direction DR1, and a third direction DR3 crossing a plane defined by the first and second directions DR1 and DR2 are defined. A front surface (or upper surface) and a rear surface (or lower surface) of each member (or each unit) constituting the display apparatus DD may be opposed to each other in the third direction DR3, and a normal direction of each of the front surface and the rear surface may be substantially parallel to the third direction DR3. A distance between the front surface and the rear surface defined along the third direction DR3 may correspond to the thickness of the member (or unit).

In the specification, the expression of "in a plan view" may be defined as a state when viewed in the third direction DR3. In the specification, the expression of "in the cross-section" may be defined as a state when viewed in the first direction DR1 or the second direction DR2. Here, directions indicated by the first to third directions DR1, DR2, and DR3 may have a relative concept and may thus be changed to other directions.

Referring to FIGS. 1A and 1B, the housing HS may provide a space in which components of the display apparatus DD are accommodated. The housing HS may extend in the first direction DR1, may include an upper surface and a lower surface parallel to each of the first direction DR1 and the second direction DR2, and may include side surfaces that connect the upper surface and the lower surface and define an accommodation space therein. The shape of the housing HS illustrated in FIGS. 1A and 1B is merely one of embodiments and is not limited to any one as long as the housing HS may accommodate the components of the display apparatus DD.

The display module DM may generate an image IM in response to an electrical signal. An upper surface of the display module DM may be defined as a display surface and the display surface may correspond to a plane parallel to each of the first direction DR1 and the second direction DR2. The display module DM may display the image IM through the display surface and a user may view the image IM. The image IM provided from the display module DM may include static images as well as dynamic images.

The display module DM may be flexible. The term "flexible" indicates a property of being bendable, and may encompass all structures from a completely foldable structure to a structure bendable to a scale of several nanometers. In an embodiment, the display module DM may be rolled about a rolling axis extending along one direction, for example.

The display module DM may be wound (or rolled) and accommodated in the housing HS, or may be unwound (or unrolled) and drawn out of the housing HS. As illustrated in FIG. 1B, the unwound and flat display module DM may have a quadrangular (e.g., rectangular) shape parallel to each of the first and second directions DR1 and DR2 in a plan view. However, the inventive concept is not limited thereto, and the unwound and flat display module DM may have, in a plan view, various shapes such as a circle and a polygon.

The support SUP may be disposed on a rear surface of the display module DM to support the display module DM. The support SUP may have a predetermined modulus. The support SUP may be provided as a bistable reeled composite, which may be also referred to as a bistable reeled composite ("BRC") structure. Accordingly, the support SUP may have two stable states, that is, a state in which an end of the support SUP is flat while being rolled, or a state in which the end of the support SUP is bent while being unrolled. The support SUP may be wound and accommodated in the housing HS, or may be unwound together when the display module DM is unwound to stably support the display module DM and may be drawn out of the housing HS. Accordingly, the support SUP may prevent the unwound display module DM from sagging or deforming. The configuration of the support SUP will be described in detail.

An opening OP may be defined in the housing HS. The opening OP may be defined in one side surface of the housing HS extending in the first direction DR1. Through the opening OP, the display module DM and the support SUP may be retracted into the housing HS or may be drawn out of the housing HS.

The handle HND may be disposed adjacent to the one side surface of the housing HS in which the opening OP is defined. In a state in which the display module DM is completely accommodated in the housing HS, the handle HND may cover the opening OP of the housing HS. The handle HND may extend in the first direction DR1 and may include a flat portion parallel to each of the first direction DR1 and the third direction DR3. However, the shape of the handle HND is not limited to any one as long as a part gripped by a hand may be provided.

One end of the display module DM and one end of the support SUP may each be connected to the handle HND. The handle HND may move to be farther away from or closer to the housing HS in the second direction DR2. As illustrated in FIG. 1A, when the handle HND approaches the housing HS, the display module DM and the support SUP may be wound and retracted into the housing HS through the opening OP. Accordingly, the display module DM and the support SUP, which are entirely accommodated in the housing HS, may not be exposed to the outside. As illustrated in FIG. 1B, when the handle HND gets farther away from the housing HS, the display module DM may be drawn out of the housing HS through the opening OP, and the support SUP may be drawn out of the housing HS through the opening OP while supporting the display module DM. Accordingly, the display surface of the display module DM may be exposed to the outside.

The handle HND may be manipulated by a user. The user may grip the handle HND and move the handle HND. However, the inventive concept is not limited thereto, and the user may move the handle HND by pressing a button provided on the display apparatus DD.

Figure 2A:
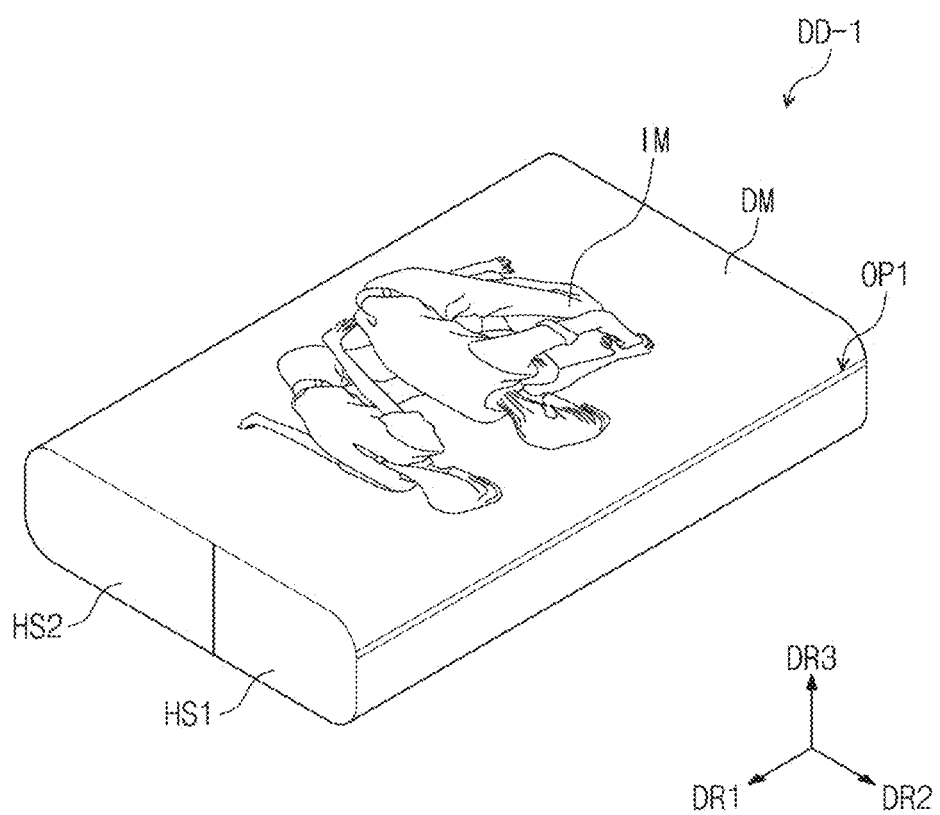
FIGS. 2A and 2B are perspective views of an embodiment of a display apparatus according to the inventive concept.
Figure 2B:
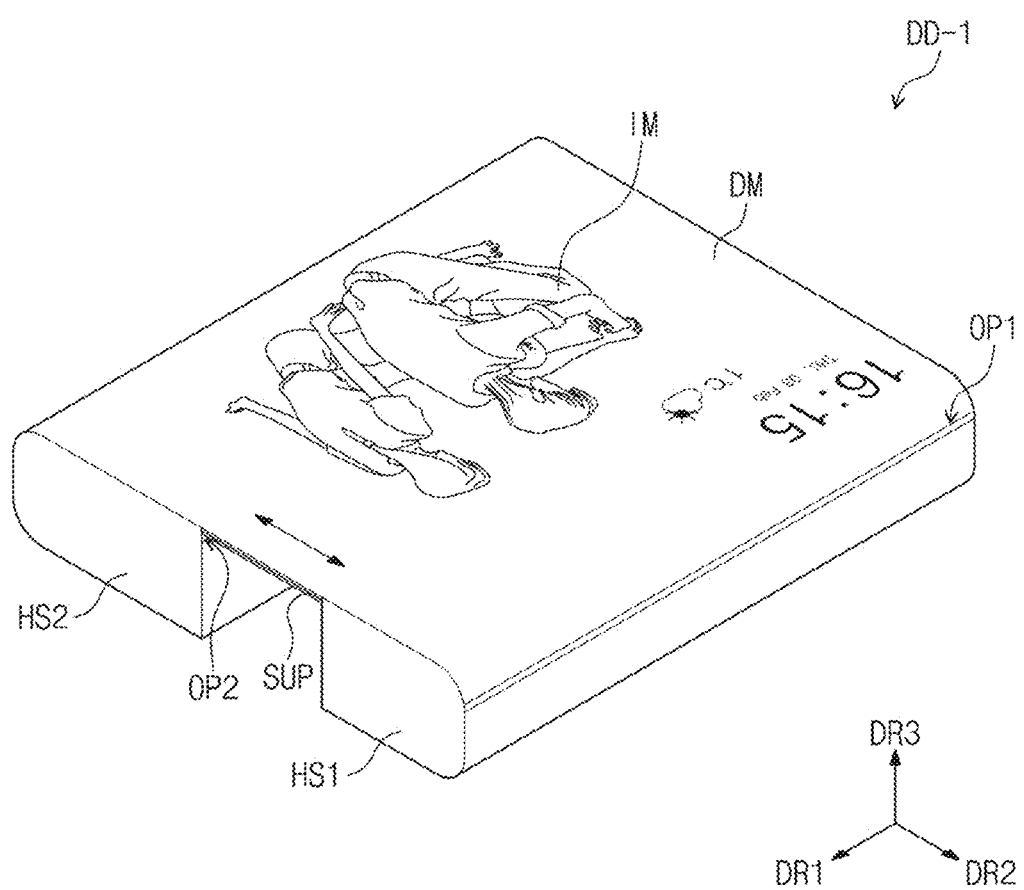

FIGS. 2A and 2B are perspective views of another embodiment of a display apparatus according to the inventive concept. Referring to FIGS. 2A and 2B, a display apparatus DD-1 may include a first housing HS1, a second housing HS2, a display module DM, and a support SUP. Components of the display apparatus DD-1 illustrated in FIGS. 2A and 2B are different in shape or structure from components of the display apparatus DD illustrated in FIGS. 1A and 1B, but the functions thereof may be substantially the same. Hereinafter, the differences will be mainly described.

Referring to FIGS. 2A and 2B, each of the first and second housings HS1 and HS2 may extend in the first direction DR1. Each of the first and second housings HS1 and HS2 may provide a space in which components of the display apparatus DD-1 are accommodated. Spaces provided by the first and second housings HS1 and HS2 may be separated from each other. In an embodiment, a portion of the wound display module DM may be accommodated in the first housing HS1, and the wound support SUP may be accommodated in the second housing HS2.

The first housing HS1 and the second housing HS2 may be disposed along the second direction DR2. The first housing HS1 and the second housing HS2 may get farther away from or approach each other in the second direction DR2. Among a first side and a second side of the first housing HS1 parallel to the first direction DR1, the first side may contact the second housing HS2 or may be closer to the second housing HS2 than the second side is. That is, the second side of the first housing HS1 may be spaced farther apart from the second housing HS2 than the first side of the first housing HS1 is. Among a first side and a second side of the second housing HS2 parallel to the first direction DR1, the first side may be spaced farther from the first housing HS1 than the second side is, and the second side of the second housing HS2 may contact the first side of the first housing HS1 or may be closer to the first housing HS1 than the first side of the second housing HS2 is.

One end of the display module DM may be connected to the first side of the second housing HS2. That is, the one end of the display module DM may be fixed to the second housing HS2.

A first opening OP1 may be defined in the first housing HS1. The first opening OP1 may be defined adjacent to the second side of the first housing HS1. The display module DM may be retracted into the first housing HS1 through the first opening OP1 or may be drawn out of the first housing HS1 through the first opening OP1.

As illustrated in FIG. 2A, a portion of the display module DM may be disposed on the first and second housings HS1 and HS2 to maintain an unrolled state, and may provide the image IM through the display surface. Here, another portion of the wound display module extending from a portion of the unrolled display module DM may be accommodated in the first housing HS1 and not exposed to the outside.

As illustrated in FIG. 2B, when the first housing HS1 and the second housing HS2 get farther away from each other, a portion of the display module DM accommodated in the first housing HS1 may be drawn out from the first housing HS1 and unrolled in the second direction DR2. In this case, the display surface of the display module DM may be further enlarged more than what is illustrated in FIG. 2A, and the user may view the image IM through an enlarged display surface.

One end of the support SUP may be connected to the first side of the first housing HS1. That is, the one end of the support SUP may be fixed to the first housing HS1.

A second opening OP2 may be defined in the second housing HS2. The second opening OP2 may be defined adjacent to the second side of the second housing HS2. The support SUP may be retracted into the second housing HS2 through the second opening OP2 or may be drawn out of the first housing HS2.

As illustrated in FIG. 2B, as the first housing HS1 moves farther away from the second housing HS2, the one end of the support SUP may be fixed to the first housing HS1 and the one end of the support SUP with the first housing HS1 may get farther away from the second housing HS2. The support SUP may be drawn out through the second opening OP2 to support one portion of the unwound display module DM. The support SUP may be provided as a bistable reeled composite. The support SUP may be wound and accommodated in the second housing HS2, or may be unwound from the second housing HS2 when the display module DM is unwound. Accordingly, the support SUP may prevent the display module DM from sagging or deforming while supporting the unwound display module DM.

Figure 3:
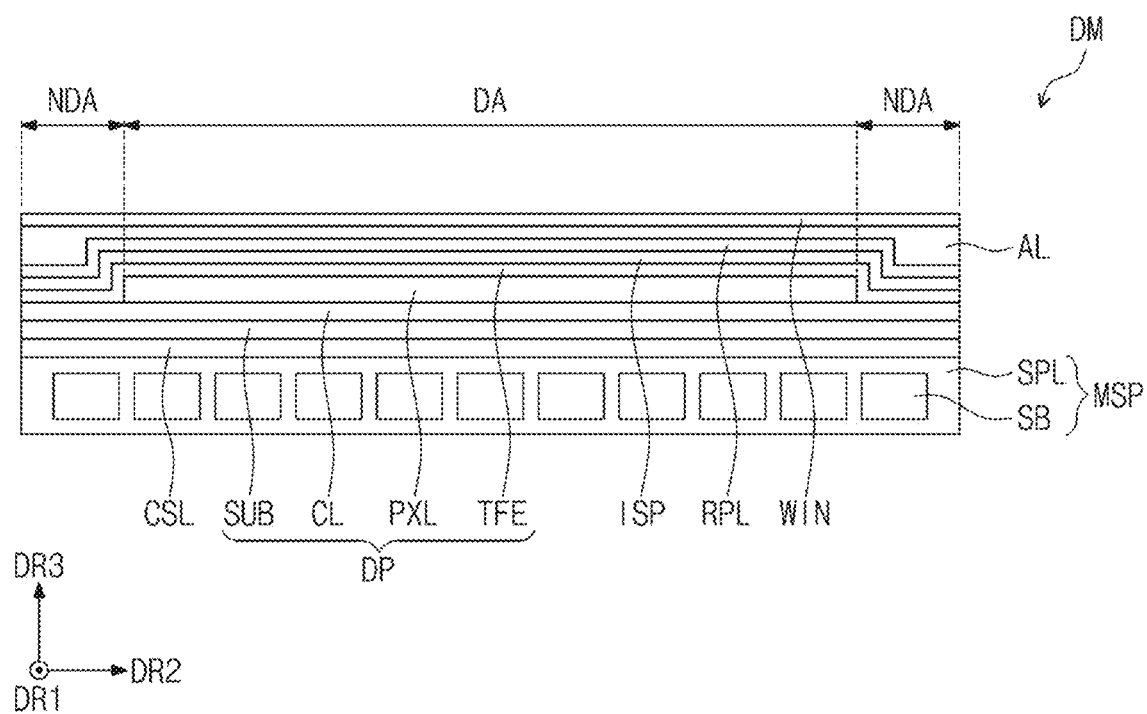
FIG. 3 is a cross-sectional view of an embodiment of a display module according to the inventive concept.

FIG. 3 is a cross-sectional view of an embodiment of a display module. Referring to FIG. 3, the display module DM may include a display panel DP, an input sensing layer ISP, an anti-reflection layer RPL, a window WIN, an adhesive layer AL, a lower member CSL, and a support member MSP.

The display panel DP may be a flexible display panel. The display panel DP in an embodiment may be a light-emitting-type display panel, but is not particularly limited thereto. In an embodiment, the display panel DP may be an organic light-emitting display panel or an inorganic light-emitting display panel, for example. A light-emitting layer of the organic light-emitting display panel may include an organic light-emitting material. A light-emitting layer of the inorganic light-emitting display panel may include an inorganic light-emitting material such as quantum dots or quantum rods.

The display panel DP may include a display region DA and a non-display region NDA. The display region DA may be a region in which the image is displayed, and the non-display region NDA may be a region in which the image is not displayed. The non-display region NDA may surround the display region DA and may define an edge of the display module DM.

The display panel DP may include a base substrate SUB, a circuit layer CL, a display element layer PXL, and an encapsulation layer TFE. The base substrate SUB, the circuit layer CL, and the display element layer PXL may be sequentially stacked along the third direction DR3.

The base substrate SUB may provide a base surface on which the circuit layer CL is disposed. The base substrate SUB may include a flexible plastic substrate. In an embodiment, the base the substrate SUB may include at least one synthetic resin layer, for example. The synthetic resin layer may include at least one of an acryl-based resin, a methacryl-based resin, a polyisoprene-based resin, a vinyl-based resin, an epoxy-based resin, a urethane-based resin, a cellulose-based resin, a siloxane-based resin, a polyimide-based resin, a perylene-based resin, or a polyimide resin. However, the material of the base substrate SUB is not limited to the embodiments described above.

The circuit layer CL may be disposed on the base substrate SUB. The circuit layer CL may include at least one insulating layer, driving elements, signal lines, or signal pads. The circuit layer CL may include a conductive pattern and a semiconductor pattern forming the driving elements, the signal lines, and the signal pads. The insulating layer, the semiconductor layer, and the conductive layer may be formed on the base substrate SUB through coating, deposition, or the like, and subsequently, the insulating layer, the semiconductor layer, and the conductive layer may be patterned through a photolithography process. Accordingly, the driving elements, the signal lines, and the signal pads included in the circuit layer CL may be formed.

The display element layer PXL may be disposed on the circuit layer CL. The display element layer PXL may include light-emitting elements disposed in the display region DA. The light-emitting elements of the display element layer PXL may be electrically connected to the driving elements of the circuit layer CL and may provide light in the display region DA in response to signals of the driving elements.

The encapsulation layer TFE may be disposed on the display element layer PXL and may encapsulate the light-emitting elements. The encapsulation layer TFE may include a plurality of thin films. The thin films of the encapsulation layer TFE may be disposed to improve the optical efficiency of the light-emitting elements or to protect the light-emitting elements. In an embodiment, the encapsulation layer TFE may include at least one inorganic film and at least one organic film. The inorganic film of the encapsulation layer TFE may protect the light-emitting elements from moisture/oxygen. The organic film of the encapsulation layer TFE may protect the light-emitting elements from foreign substances such as dust particles.

The input sensing layer ISP may be disposed on the display panel DP. The input sensing layer ISP may be directly disposed on the display panel DP without a separate adhesive member. That is, the input sensing layer ISP may be formed through a continuous process on the base surface provided by the display panel DP after the display panel DP is manufactured. In an embodiment, the input sensing layer ISP may be disposed directly on the encapsulation layer TFE, for example. However, the inventive concept is not limited thereto, and the input sensing layer ISP may be manufactured in a form of a panel through a separate process different from the display panel DP manufacturing process, and then attached to the display panel DP by an adhesive member.

The input sensing layer ISP may sense an external input which is applied from the outside of the display module DM, and obtain coordinate information on the external input. The input sensing layer ISP may be driven in various methods, such as a capacitive method, a resistive method, an infrared method, or a pressure method, and is not limited thereto.

The anti-reflection layer RPL may be disposed on the input sensing layer ISP. The anti-reflection layer RPL may be directly disposed on the input sensing layer ISP. However, the inventive concept is not limited thereto, and the anti-reflection layer RPL may be attached onto the input sensing layer ISP through a separate adhesive member.

The anti-reflection layer RPL may reduce the reflectance of external light which is incident from an upper side of the display module DM. The anti-reflection layer RPL may include various embodiments that reduce external light reflectance.

In an embodiment, the anti-reflection layer RPL may include a phase retarder and/or a polarizer. The phase retarder may include a $\lambda/2$ phase retarder and/or a $\lambda/4$ phase retarder. The polarizer may include a film type polarizer or a liquid crystal coating type polarizer. The film type polarizer may include a stretchable synthetic resin film, and the liquid crystal coating type polarizer may include liquid crystals arranged in a predetermined arrangement. However, the inventive concept is not limited thereto, and the phase retarder and the polarizer may be implemented in the form of a single polarizing film.

In an embodiment, the anti-reflection layer RPL may include color filters. The color filters may be disposed to correspond to an arrangement and an emission color of pixels included in the display panel DP. The color filters may filter external light incident onto the display panel DP with the same color as the color emitted by the pixels. The anti-reflection layer RPL may further include a black matrix disposed adjacent to the color filters.

In an embodiment, the anti-reflection layer RPL may include a destructive interference structure. In an embodiment, the destructive interference structure may include a first reflection layer and a second reflection layer which are disposed on different layers, for example. First reflected light that is reflected from the first reflective layer and second reflected light that is reflected from the second reflective layer may destructively interfere, and accordingly, the anti-reflection layer RPL may reduce the reflectance of external light.

The adhesive layer AL may be disposed on the anti-reflection layer RPL. The adhesive layer AL may be disposed between the anti-reflection layer RPL and the window WIN, and may couple the anti-reflection layer RPL and the window WIN. The adhesive layer AL may include a transparent adhesive film such as an optically clear adhesive film ("OCA"), an optically clear resin ("OCR"), or a pressure sensitive adhesive film ("PSA"). However, the type of an adhesive included in the adhesive layer AL is not limited thereto.

The window WIN may be disposed on the anti-reflection layer RPL. The window WIN may cover the entirety of the upper surface of the display module DM, and may protect the display module DM from external impact and scratches.

The window WIN may include an optically transparent insulating material. In an embodiment, the window WIN may include glass, sapphire, or a polymer, for example. The window WIN may have a multi-layered or single-layered structure. The window WIN may further include a functional layer such as an anti-fingerprint layer, a phase control layer, and a hard coating layer which are disposed on an optically transparent substrate.

The window WIN may further include a bezel pattern disposed to correspond to the non-display region NDA. The bezel pattern may include a material having a color and may have a relatively low light transmittance. The bezel pattern may prevent components of the display panel DP and the input sensing layer ISP, which are disposed to overlap the bezel pattern, from being viewed from the outside.

The lower member CSL may be disposed on the rear surface of the display panel DP. The lower member CSL may be attached to the rear surface of the display panel DP through an adhesive member, or may be directly formed on the rear surface of the display panel DP without being limited thereto.

The lower member CSL may include at least one of an impact absorbing layer or a protective film layer that protects the display panel DP from external impact. The protective film layer may include a polymer material having flexibility, such as polyethylene terephthalate or polyimide, or materials having rigidity, such as stainless steel. The impact absorbing layer may include a material such as a sponge, foam, or urethane resin, and may absorb an impact applied to the display panel DP. However, an embodiment of the lower member CSL is not limited to any one as long as the lower member CSL may protect the display panel DP.

The support member MSP may include a support layer SPL and a plurality of support bars SB. The support bars SB may be arranged along a direction crossing an extension direction of the support bars SB. In an embodiment, as illustrated in FIG. 3, each of the support bars SB may extend along the first direction DR1, and the support bars SB may be arranged in the support layer SPL along the second direction DR2, for example. The support bars SB may be spaced apart from each other at equal intervals in the second direction DR2. However, the intervals between the support bars SB are not limited thereto.

Each of the support bars SB may have a quadrangular (e.g., rectangular) shape in a cross-section viewed in the extension direction of the support bars SB. However, the shape of the support bars SB in the cross-section is not limited thereto, and may have a circular shape, an oval shape, or a polygonal shape such as a rhombus, an inverted trapezoid, or an inverted triangle.

The support layer SPL may cover the support bars SB. In an embodiment, the support bars SB may be inserted into the support layer SPL. That is, the unitary support layer SPL may cover an upper surface, a lower surface, and a side surface of each of the support bars SB. The support layer SPL may be filled between the support bars SB spaced apart from each other along the second direction DR2 and may connect the support bars SB. However, the support layer SPL does not completely cover the entirety of the surface of the support bars SB, but may be provided as a plurality of portions filling the spaces between the support bars SB. However, the inventive concept is not limited thereto, and the support layer SPL may be omitted. In this case, the support bars SB may not be covered by the support layer SPL and may be disposed on the rear surface of the display panel DP, and thus support the display panel DP.

A modulus of each of the support bars SB may be greater than a modulus of the support layer SPL. In an embodiment, the modulus of each of the support bars SB may be about 1 gigapascal (GPa) to about 500 gigapascals (GPa), and specifically, about 50 gigapascals (GPa) to about 200 gigapascals (GPa), for example. The modulus of the support layer SPL may be about 10 kilopascals (KPa) to about 20 megapascals (MPa), and specifically, about 10 kilopascals (KPa) to about 100 kilopascals (KPa). However, the modulus values of the support bars SB and the support layer SPL are not limited to the above embodiments. The support bars SB each having a relatively high modulus may enhance the impact resistance of the support member MSP and may stably support the display panel DP.

The support bars SB may include a material having greater rigidity than that of the support layer SPL. In an embodiment, the support bars SB may include aluminum, stainless steel, or invar, for example. However, the material of the support bars SB is not limited to the above example.

The support layer SPL may include a material having greater flexibility than that of the support bars SB. The support layer SPL may include an elastic polymer having a predetermined elastic force. In an embodiment, the support layer SPL may include at least one of thermoplastic polyurethane, silicone, thermoplastic rubbers, elastolefin, thermoplastic olefin, polyamide, polyether block amide, synthetic polyisoprene, polybutadiene, chloroprene rubber, butyl rubber, styrene-butadiene, epichlorohydrin rubber, polyacrylic rubber, silicone rubber, fluorosilicone rubber, fluoroelastomers, or ethylene-vinyl acetate, for example. However, the material of the support layer SPL is not limited to the above example.

The support layer SPL may connect the support bars SB, and may allow the support member MSP to be easily bent with a curvature. The support layer SPL may cover the support bars SB and may provide a flat upper surface to the display panel DP. Accordingly, the support layer SPL may improve the surface quality of the display panel DP.

Figure 4:
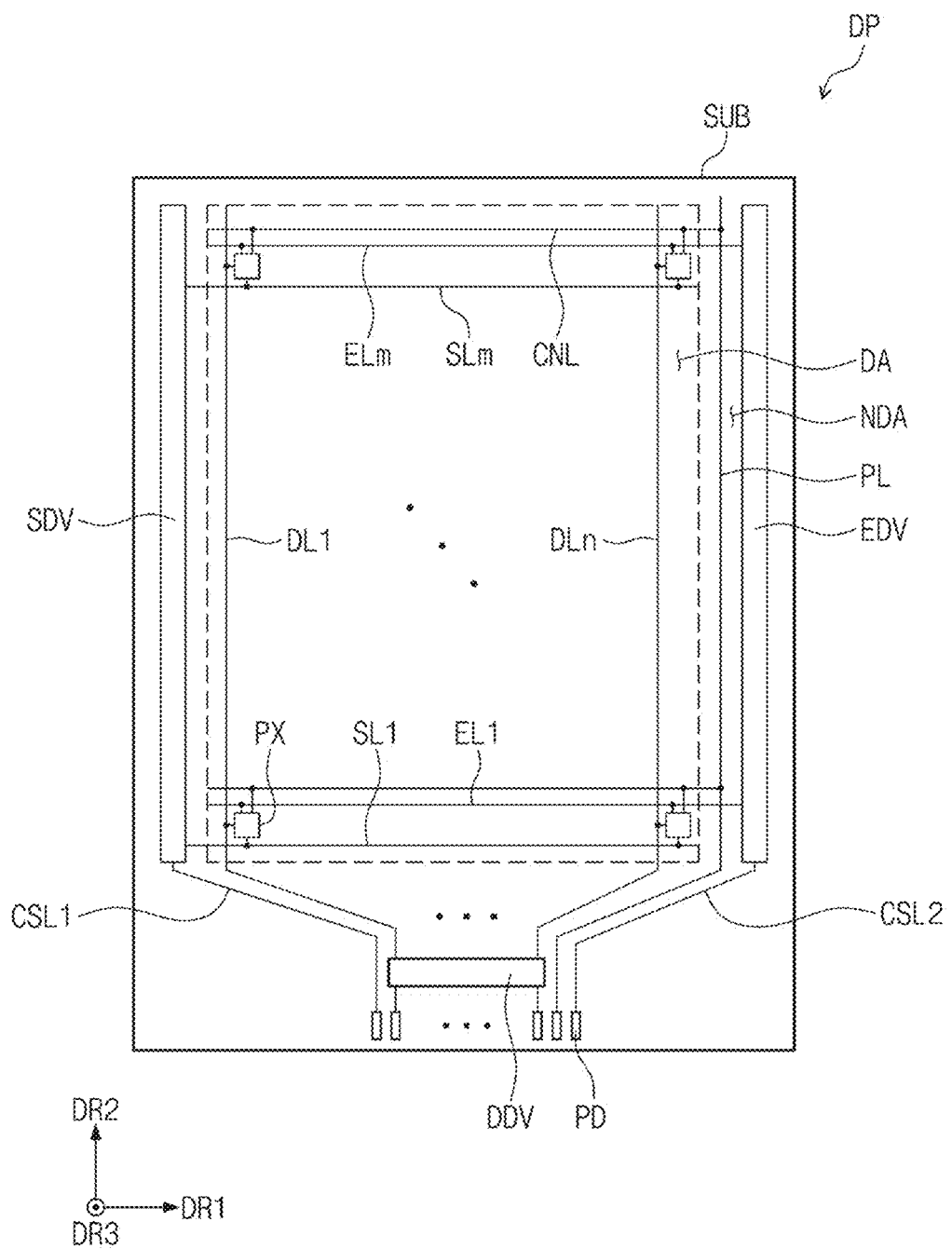
FIG. 4 is a plan view of an embodiment of a display panel according to the inventive concept.

FIG. 4 is a plan view of an embodiment of a display panel. FIG. 4 schematically illustrates one configuration of the display panel DP in a plan view.

Referring to FIG. 4, the display panel DP may include a base substrate SUB, a plurality of pixels PX, a plurality of signal lines SL1 to SLm, DL1 to DLn, EL1 to ELm, CSL1, CSL2, PL, and CNL electrically connected to the pixels PX, a scan driver SDV, a data driver DDV, and an emission driver EDV. Here, n and m are natural numbers.

The base substrate SUB may provide a base surface on which electrical elements and wirings of the display panel DP are disposed. FIG. 4 illustrates the base substrate SUB having a quadrangular (e.g., rectangular) shape parallel to each of the first and second directions DR1 and DR2 in a plan view. However, the inventive concept is not limited thereto, and the base substrate SUB may be designed in various shapes depending on the structure of the display module DM (refer to FIGS. 1B and 2B).

Each of the pixels PX may include a light-emitting element and a pixel driving circuit including a plurality of transistors (e.g., a switching transistor, a driving transistor, etc.) connected to the light-emitting element and at least one capacitor. Each of the pixels PX may emit light in response to an electrical signal applied to the pixel PX.

The pixels PX may be disposed in the display region DA. However, this is illustrated by way of example, and some of the pixels PX may include the transistor disposed in the non-display region NDA, and the inventive concept is not limited thereto.

Each of the scan driver SDV, the data driver DDV, and the emission driver EDV may be disposed in the non-display region NDA. However, the inventive concept is not limited thereto, and at least one of the scan driver SDV, the data driver DDV, or the emission driver EDV may overlap the display region DA, and thus an area of the non-display region NDA of the display panel DP may be reduced.

The data driver DDV may be provided in the form of an integrated circuit chip defined as a driving chip, and may be disposed (e.g., mounted) in the non-display region NDA of the display panel DP. However, the inventive concept is not limited thereto, and the data driver DDV may be disposed (e.g., mounted) on a separate flexible circuit board connected to the display panel DP and electrically connected to the display panel DP.

The plurality of signal lines SL1 to SLm, DL1 to DLn, EL1 to ELm, CSL1, CSL2, PL, and CNL may include a plurality of scan lines SL1 to SLm, a plurality of data lines DL1 to DLn, a plurality of emission lines EL1 to ELm, and first and second control lines CSL1 and CSL2, a power line PL, and connection lines CNL. Here, m and n are natural numbers.

The scan lines SL1 to SLm may extend in the first direction DR1 and may be connected to the scan driver SDV. The data lines DL1 to DLn may extend in the second direction DR2 and may be connected to the data driver DDV. The emission lines EL1 to ELm may extend in the first direction DR1 and may be connected to the emission driver EDV.

The power line PL may extend in the second direction DR2 and may be disposed in the non-display region NDA. The power line PL may be disposed between the display region DA and the emission driver EDV. However, the arrangement position of the power line PL is not limited thereto.

Each of the connection lines CNL may extend in the first direction DR1, and the connection lines CNL may be arranged in the second direction DR2 and may be connected to the power line PL and the pixels PX. Each of the connection lines CNL may be disposed in a layer different from the power line PL and may be electrically connected through a contact hole. However, the inventive concept is not limited thereto, and the connection lines CNL may be unitary in the same layer as the power line PL. A power supply voltage may be applied to the pixels PX through the power line PL and the connection lines CNL connected to each other.

The first control line CSL1 may be connected to the scan driver SDV. The second control line CSL2 may be connected to the emission driver EDV.

The pads PD may be disposed adjacent to a lower end of the non-display region NDA. The pads PD may be disposed closer to the lower end of the display panel DP than to the data driver DDV. The pads PD may be spaced apart from each other along the first direction DR1.

The display apparatus DD (refer to FIG. 1A) may include a circuit board including a timing controller for controlling operations of the scan driver SDV, the data driver DDV, and the emission driver EDV, and a voltage generator for generating a voltage. The pads PD may be portions to which the circuit board of the display apparatus DD (refer to FIG. 1A) is connected.

Each of the pads PD may be connected to a corresponding signal line among the plurality of signal lines. In an embodiment, the pads PD may be respectively connected to the power line PL and the first and second control lines CSL1 and CSL2, for example. The data lines DL1 to DLn may be respectively electrically connected to the pads PD through the data driver DDV.

The scan driver SDV may generate scan signals in response to a scan control signal. The scan signals may be applied to the pixels PX through the scan lines SL1 to SLm. The data driver DDV may generate data voltages corresponding to the image signals in response to the data control signal. The data voltages may be applied to the pixels PX through the data lines DL1 to DLn. The emission driver EDV may generate light emission signals in response to the light emission control signal. The light emission signals may be applied to the pixels PX through the emission lines EL1 to ELm.

The pixels PX may receive the data voltages in response to the scan signals. The pixels PX may display the image by emitting light, which has luminance corresponding to the data voltages, in response to the light emission signals. Light emission times of the pixels PX may be controlled by the light emission signals. Accordingly, the display panel DP may output the image through the display region DA by the pixels PX.

Figure 5B:
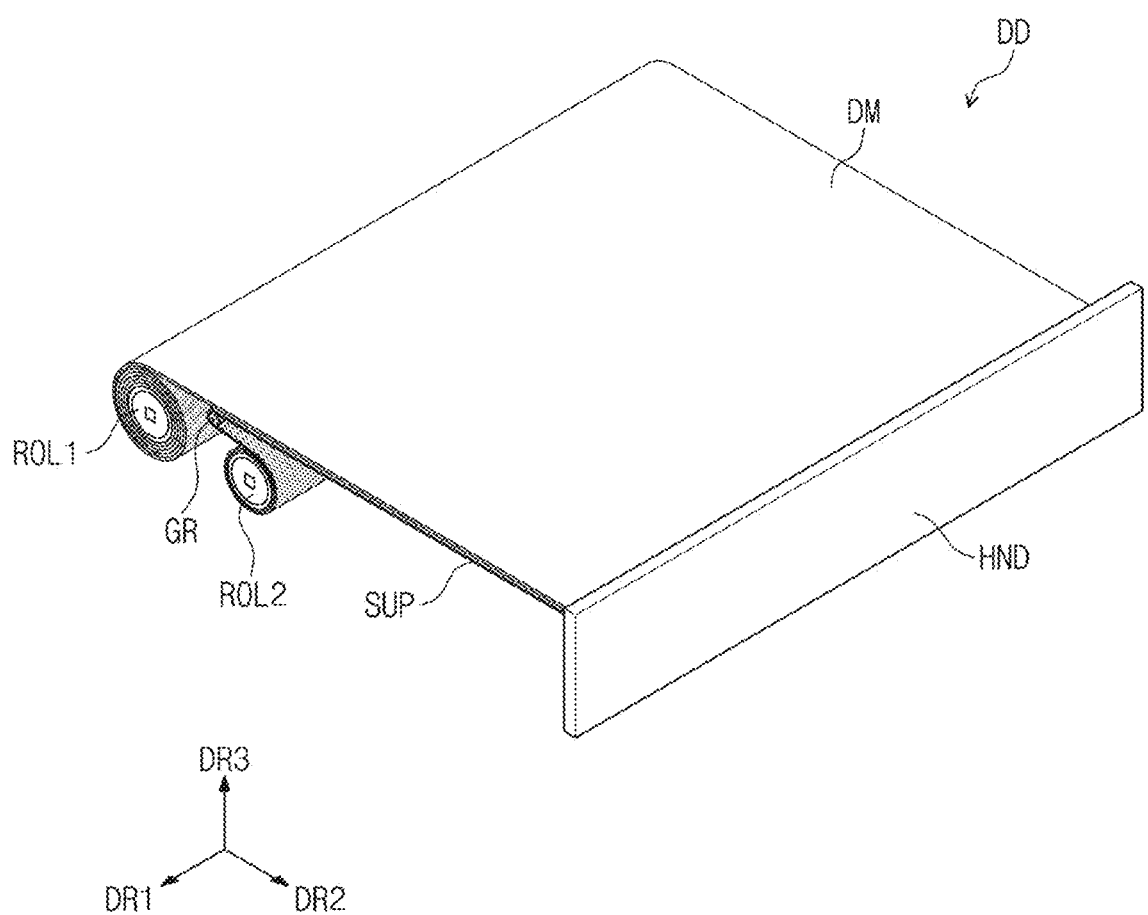

FIGS. 5A and 5B are perspective views of an embodiment of some components of a display apparatus. FIG. 5A is an exploded perspective view of the housing HS of the display apparatus DD illustrated in FIG. 1B. FIG. 5B illustrates some components of the display apparatus DD disposed inside the housing HS.

Referring to FIG. 5A, the housing HS may include an upper surface part HS1-1 and a lower surface part HS1-2, which are parallel to each of the first and second directions DR1 and DR2 and which face each other in the third direction DR3, and side surface parts HS2-1, HS2-2, HS2-3, and HS2-4 connecting the upper surface part HS1-1 and the lower surface part HS1-2. The side surface parts HS2-1, HS2-2, HS2-3, and HS2-4 may include first to fourth side surface parts HS2-1, HS2-2, HS2-3, and HS2-4.

The first side surface part HS2-1 may be bent from each of one side of the upper surface part HS1-1 and one side of the lower surface part HS1-2, which are parallel to the first direction DR1, and may connect the upper surface part HS1-1 and the lower surface part HS1-2. The second side surface part HS2-2 may be connected to each of the other side of the upper surface part HS1-1 and the other side of the lower surface part HS1-2 which are parallel to the first direction DR1. The first side surface part HS2-1 and the second side surface part HS2-2 may face each other in the second direction DR2. An opening OP may be defined in the second side surface part HS2-2. The opening OP may be defined adjacent to an upper portion of the second side surface part HS2-2, but the inventive concept is not limited thereto.

The third side surface part HS2-3 may be connected to each of one end of the upper surface part HS1-1 and one end of the lower surface part HS1-2 which are parallel to the second direction DR2, and the fourth side surface part HS2-4 may be connected to each of the other end of the upper surface part HS1-1 and the other end of the lower surface part HS1-2 which are parallel to the second direction DR2. The third side surface part HS2-3 and the fourth side surface part HS2-4 may face each other in the first direction DR1 and may be connected to the first side surface part HS2-1 and the second side surface part HS2-2.

The handle HND may be adjacent to the second side surface part HS2-2 in which the opening OP is defined. The handle HND may face the second side surface part HS2-2 in the second direction DR2. However, the shape of the handle HND is not limited to that illustrated in FIG. 5A.

The display apparatus DD may include a first roller ROL1, a second roller ROL2, and guide rollers GR. The first roller ROL1, the second roller ROL2, and the guide rollers GR may be accommodated in the housing HS.

The first roller ROL1 and the second roller ROL2 may have a cylindrical shape extending in the first direction DR1. The first roller ROL1 and the second roller ROL2 may be spaced apart from each other in the second direction DR2. The second roller ROL2 may be closer to the second side surface HS2-2 of the housing HS than the first roller ROL1 is. Each of the first roller ROL1 and the second roller ROL2 may be connected to an inner surface INS of the third side surface part HS2-3 and an inner surface INS of the fourth side surface part HS2-4.

Each of the guide rollers GR may have a cylindrical shape extending in the first direction DR1. The guide rollers GR may be spaced apart from each other in the first direction DR1 and may be respectively connected to the inner surface INS of the third side surface part HS2-3 and the inner surface INS of the fourth side surface part HS2-4. The guide rollers GR may face each other in the first direction DR1. Each of the guide rollers GR may be disposed between the first roller ROL1 and the second roller ROL2, and may be disposed closer to the upper surface part HS1-1 of the housing HS than the second roller ROL2 is.

Referring to FIG. 5B, the one end of the display module DM parallel to the first direction DR1 may be connected to the handle HND, and the other end may be connected to the first roller ROL1. The one end of the support SUP parallel to the first direction DR1 may be connected to the handle HND, and the other end may be connected to the second roller ROL2.

Referring to FIGS. 5A and 5B, the display module DM and the support SUP may be wound or unwound depending on the movement of the handle HND. When the handle HND gets farther away from the housing HS in the second direction DR2, the display module DM may be unwound from the first roller ROL1, and the support SUP may be unwound from the second roller ROL2. When the handle HND moves to be adjacent to the housing HS in the second direction DR2, the display module DM may be wound on the first roller ROL1, and the support SUP may be wound on the second roller ROL2.

When the display module DM is unwound from the first roller ROL1, the support SUP may be simultaneously unwound from the second roller ROL2. A rotation direction of the first roller ROL1 that unwinds the display module DM and a rotation direction of the second roller ROL2 that unwinds the support SUP may be opposed to each other. That is, the display module DM may be rotated about a first rolling axis corresponding to a center of the first roller ROL1, the support SUP may be rotated about a second rolling axis corresponding to a center of the second roller ROL2, and a rotation direction of the display module DM and a rotation direction of the support SUP may be opposed to each other.

The guide rollers GR may be disposed under the display module DM. The support SUP may be unwound or wound via the guide rollers GR, and a portion thereof may be bent by the guide rollers GR. The support SUP may contact outer peripheral surfaces of the guide rollers GR. An upper surface of the unwound support SUP may face the rear surface of the display module DM, and a lower surface of the support SUP opposite to the upper surface of the support SUP may contact the guide rollers GR.

The support SUP may be disposed on the rear surface of the display module DM by the guide rollers GR, and may support the display module DM. Specifically, the support SUP unwound from the second roller ROL2 may be guided to be disposed on the rear surface of the display module DM by the guide rollers GR, and may support the portion of the display module DM unrolled in the second direction DR2.

Figure 6:
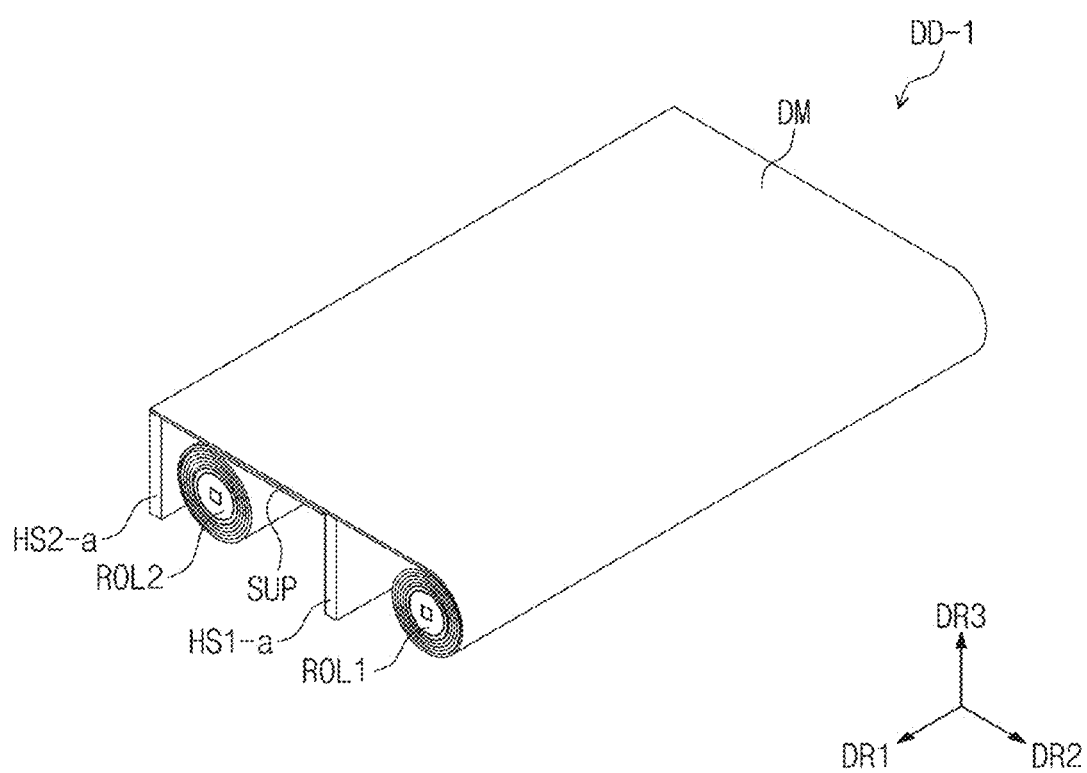
FIG. 6 is a perspective view of some components of an embodiment of a display apparatus according to the inventive concept.

FIG. 6 is a perspective view of an embodiment of some components of a display apparatus. FIG. 6 illustrates some components of the display apparatus DD-1 disposed in the housings HS1 and HS2 illustrated in FIG. 2B.

FIG. 6 schematically illustrates a first side surface part HS1-*a* of the first housing HS1 (refer to FIG. 2B) and a second side surface part HS2-*a* of the second housing HS2 (refer to FIG. 2B). The first side surface part HS1-*a* may correspond to the above-described first side of the first housing HS1 (refer to FIG. 2B), and the second side surface part HS2-*a* may correspond to the above-described first side of the second housing HS2 (refer to FIG. 2B).

Referring to FIG. 6, the display apparatus DD-1 may include a first roller ROL1 and a second roller ROL2. The first roller ROL1 may be accommodated in the first housing HS1 (refer to FIG. 2B), and the second roller ROL2 may be accommodated in the second housing HS2 (refer to FIG. 2B).

Each of the first roller ROL1 and the second roller ROL2 may have a cylindrical shape extending in the first direction DR1. The first roller ROL1 and the second roller ROL2 may be spaced apart from each other in the second direction DR2.

One end of the display module DM parallel to the first direction DR1 may be connected to the second side surface part HS2-*a* of the second housing HS2 (refer to FIG. 2B), and the other end of the display module DM may be connected to the first roller ROL1 One end of the support SUP parallel to the first direction DR1 may be connected to the first side surface part HS1-*a* of the first housing HS1 (refer to FIG. 2B), and the other end of the support SUP may be connected to the second roller ROL2.

The display module DM and the support SUP may be wound or unwound according to the movement of the first and second housings HS1 and HS2 (refer to FIG. 2B). As the first and second housings HS1 and HS2 (refer to FIG. 2B) move, the first side surface part HS1-*a* and the second side surface part HS2-*a* may approach each other or may get farther away from each other in the second direction DR2. When the first side surface part HS1-*a* and the second side surface part HS2-*a* get farther away from each other in the second direction DR2, the display module DM may be unwound from the first roller ROL1, and the support SUP may be unwound from the second roller ROL2. When the first side surface part HS1-*a* and the second side surface part HS2-*a* move to approach each other in the second direction DR2, the display module DM may be wound on the first roller ROL1, and the support SUP may be wound on the second roller ROL2.

The first side surface part HS1-*a* may be disposed on the rear surface of the display module DM, and accordingly, the support SUP connected to the first side surface part HS1-*a* may be disposed on the rear surface of the display module DM. When the display module DM is unwound from the first roller ROL1, the support SUP may be simultaneously unwound from the second roller ROL2. A rotation direction of the first roller ROL1 that unwinds the display module DM and a rotation direction of the second roller ROL2 that unwinds the support SUP may be opposed to each other. That is, the rotation direction of the display module DM that is rotated by the first roller ROL1 and the rotation direction of the support SUP that is rotated by the second roller ROL2 may be opposed to each other. The support SUP unwound from the second roller ROL2 may support the rear surface of the display module DM.

Figure 7A:
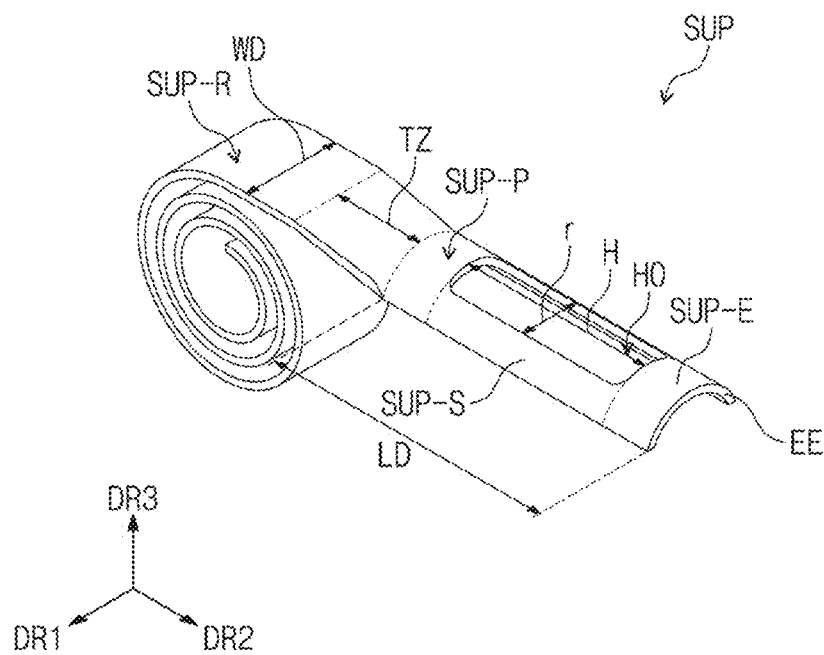
FIGS. 7A and 7B are perspective views of an embodiment of a support according to the inventive concept.
Figure 7B:
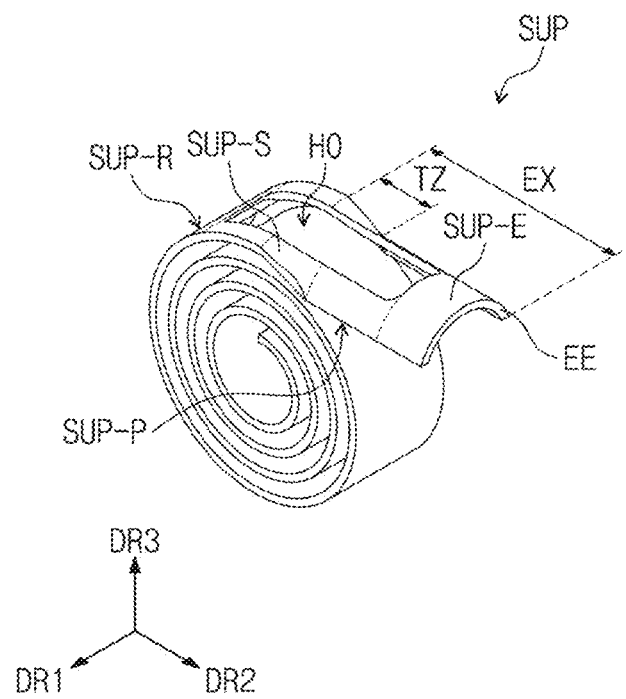

FIGS. 7A and 7B are perspective views of an embodiment of a support.

Referring to FIGS. 7A and 7B, the support SUP may be wound or unwound about a rolling axis parallel to the first direction DR1. A portion of the unwound support SUP may extend in the second direction DR2.

The support SUP may be a BRC structure having a predetermined rigidity. In an embodiment, the support SUP may include reinforcement fibers, for example, but the material of the support SUP is not limited to the above-described example. As the support SUP is provided as a BRC structure, the support SUP may have two stable states.

Referring to FIG. 7A, a wound portion SUP-R of the support SUP may be bent with a curvature in the second direction DR2 with respect to the rolling axis extending along the first direction DR1. Accordingly, the wound portion SUP-R of the support SUP may have a first stable state in which the wound portion SUP-R maintains a flat state in the width direction WD parallel to the first direction DR1.

An unwound portion SUP-P of the support SUP may extend in the longitudinal direction LD parallel to the second direction DR2, may maintain an unrolled state in the longitudinal direction LD, and may have a second stable state in which the unwound portion SUP-P is bent in the width direction WD. Accordingly, an end part SUP-E may be convex upward in the width direction WD parallel to the first direction DR1.

The support SUP may include an end part SUP-E and side parts SUP-S extending from the end part SUP-E. The end part SUP-E of the support SUP may extend along the first direction DR1 and define one end EE (or the end EE) of the unwound support SUP. The side parts SUP-S of the support SUP may each extend along the second direction DR2 from the end part SUP-E, and may define a portion of opposite sides of the support SUP parallel to the second direction DR2.

A hole HO passing through the support SUP may be defined in the support SUP. The hole HO may be defined adjacent to the one end EE of the support SUP. The end part SUP-E and the side parts SUP-S that are connected to each other may surround at least a portion of the hole HO. The end part SUP-E may be defined as a portion of the support SUP having a distance corresponding to a distance from the one end EE of the support SUP to the hole HO adjacent to the one end EE in the second direction DR2. An inner side surface, which is exposed by the hole HO and is opposite to the one end EE of the support SUP in the second direction DR2, may correspond to the side surface of the end part SUP-E. The side parts SUP-S may be disposed along the first direction DR1 with the hole HO therebetween.

The hole HO may extend along the second direction DR2. A length H of the hole HO in the second direction DR2 may be greater than a width r of the hole HO in the first direction DR1. However, the inventive concept is not limited thereto, and a size of the hole HO may vary depending on a modulus of the support SUP, a length of the support SUP, and a support force desired for the support SUP, or the like.

The hole HO may have a circular, oval, or polygonal shape in a plan view. However, the shape of the hole HO in a plan view is not limited thereto, and the hole HO may be provided in various shapes as long as having the end part SUP-E and the side parts SUP-S capable of supporting the display panel. The hole HO may be provided as a single hole in the support SUP. FIG. 7A illustrates a single hole HO having a quadrangular (e.g., rectangular) shape in a plan view. However, the inventive concept is not limited thereto. The hole HO may be provided in plural in the support SUP and may be spaced apart along one direction. Various embodiments of the hole HO will be described in detail later with reference to the drawings.

A transition region TZ which changes from the first stable state to the second stable state may be provided between the wound portion SUP-R of the support SUP and the unwound portion SUP-P of the support SUP that is unwound and extends parallel to the second direction DR2. That is, in order to stably maintain the rolled state in which the support SUP is accommodated in the housing of the display apparatus, the support SUP may be desired to be unwound by a predetermined length in the second direction DR2, which may vary depending on the size of the transition region TZ. However, as the support SUP is unwound by a predetermined length, a space for accommodating the support SUP is desired to be increased and the size of the display apparatus DD and DD-1 (refer to FIGS. 1A and 2A) may also be increased.

As the support SUP in an embodiment defines the hole HO adjacent to the end EE of the support SUP, a predetermined length by which the support SUP needs to be unwound in order to be stably maintained may be minimized. That is, the size of the transition region TZ of the support SUP may be minimized. Accordingly, a space desired for stably accommodating the support SUP in the housing may be minimized, and a dead space of the display apparatus may be minimized, so that the display apparatus may be designed in a compact manner.

The length H of the hole HO in the second direction DR2 may be about 30% or less of the length of the support SUP. As the length H of the hole HO in the second direction DR2 decreases, the support force of the support SUP increases, but the size of the transition region TZ of the support SUP may also increase. As the length H of the hole HO in the second direction DR2 increases, the size of the transition region TZ of the support SUP may decrease, but the support force of the support SUP may also decrease. Accordingly, by adjusting the size of the hole HO, the support SUP may have a predetermined support force and the transition region TZ of the support SUP may be minimized.

When a force is applied downward from the upper surface of the support SUP, the size of the hole HO in which the support SUP may have a predetermined support force may be calculated using a deflection of the support SUP. This will be described in detail with reference to FIGS. 8A to 8C.

FIG. 7B illustrates a perspective view of a stably rolled support SUP. Referring to FIG. 7B, at least a portion of the side part SUP-S may be rolled about a rolling axis extending along the first direction DR1. A transition region TZ may be formed in a region between a portion of the rolled side part SUP-S and a portion of the side part SUP-S connected to the end part SUP-E.

As the hole HO is defined in the support SUP, the rigidity of the support SUP may be reduced in one region adjacent to the end part SUP-E, and accordingly, the size of the transition region TZ may also be reduced. Accordingly, the length of the unrolled portion EX of the stably rolled support SUP may be minimized, and a space for accommodating the support SUP may be minimized, thereby reducing the dead space of the display apparatus.

Figure 8A:
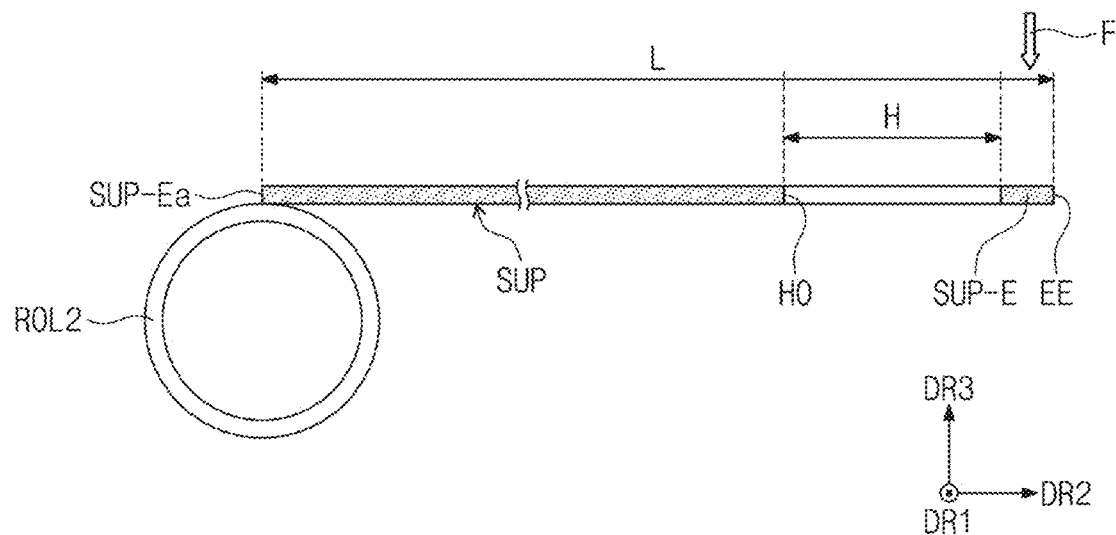
FIGS. 8A to 8C are cross-sectional views of an embodiment of a support according to the inventive concept.
Figure 8B:
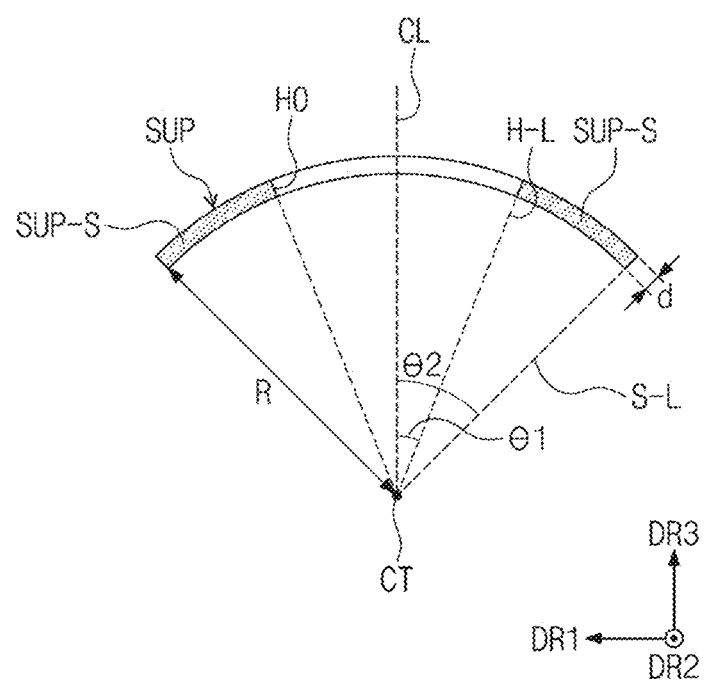
Figure 8C:
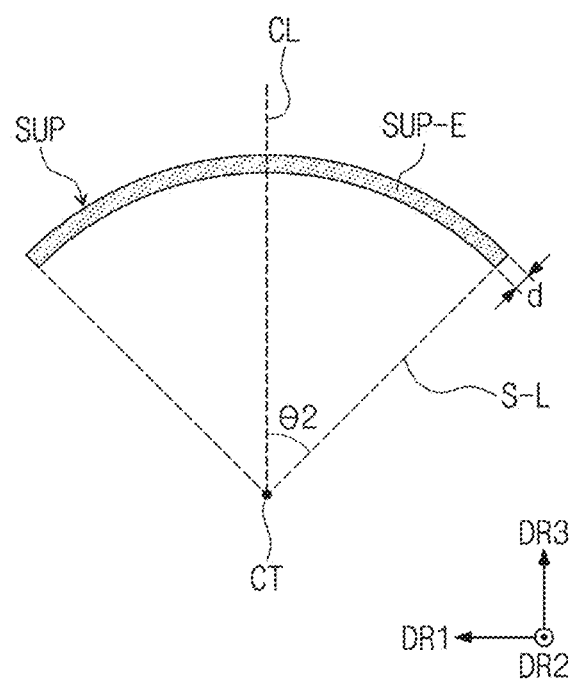

FIGS. 8A to 8C are cross-sectional views of an embodiment of a support according to the inventive concept. FIG. 8A illustrates a cross-sectional view of the support SUP as viewed from the first direction DR1 parallel to the rolling axis, FIG. 8B illustrates a cross-sectional view of a portion of the support SUP, in which the hole HO is defined, as viewed from the second direction DR2, and FIG. 8C illustrates a cross-sectional view of the end part SUP-E of the support SUP as viewed from the second direction DR2.

Referring to FIG. 8A, the end part SUP-E of the support SUP may be spaced apart from the second roller ROL2, and the other end SUP-Ea of the support SUP, which is spaced apart from one end EE defined by the end part SUP-E of the support SUP in the second direction DR2, may be connected to the second roller ROL2. The support SUP unwound from second roller ROL2 may have a predetermined length L from the one end EE to the other end SUP-Ea and may extend in the second direction DR2.

When a force F is applied downwards onto the end part SUP-E of the support SUP, the deflection of the support SUP in the third direction DR3 may vary depending on the magnitude of the force F and the length H of the hole HO in the second direction DR2. Specifically, by a bending moment of the end part SUP-E, a bending moment of a portion of the support SUP with the hole HO defined therein, a modulus of the support SUP, and a length L of the support SUP, the deflection of the support SUP in the third direction DR3 according to the length H of the hole HO in the second direction DR2 when the force F having a predetermined magnitude is applied thereto may be calculated. Using this, the maximum size of the hole HO in which the support SUP may have a predetermined support force may be calculated.

Equation 1 below is a formula for calculating the deflection of the support SUP.

$$\text{Deflection} = \frac{F}{3EI_1}(L^3 - H^3) + \frac{F}{3EI_2}H^3 \qquad \text{[Equation 1]}$$

In Equation 1, the reference symbol F is the magnitude of the force F, and the reference symbol E is the modulus of the support SUP. The reference symbol L is the length L of the support SUP in the second direction DR2, and the reference symbol H is the length H of the hole HO in the second direction DR2. The reference symbol $I_1$ is a bending moment corresponding to the end part SUP-E of the support SUP, and the reference symbol $I_2$ is a bending moment corresponding to a portion of the support SUP in which the hole HO is defined.

Referring to FIGS. 8B and 8C, the side part SUP-S and the end part SUP-E of the support SUP, which is unwound from the second roller ROL2 and extends along the second direction DR2, may be bent with a radius of curvature R with respect to a center of curvature CT. The center of curvature CT may be defined on the lower surface of the support SUP.

Referring to FIG. 8B, the support SUP may have a thickness d, and the hole HO may be defined between the side parts SUP-S of the support SUP. A cross-section of the support SUP as viewed in the second direction DR2 may have a substantially symmetrical shape with respect to a virtual center line CL passing through the center of the hole HO.

The virtual center line CL may correspond to a virtual line connecting the center of curvature CT to the center of the hole HO. A first angle θ1 may be formed between the virtual center line CL and a first virtual line H-L that connects the center of curvature CT to the inner side surface of the side part SUP-S defining the hole HO. A second angle θ2 may be formed between the virtual center line CL and a second virtual line S-L that connects the center of curvature CT to the outer side surface of the side part SUP-S. The bending moment corresponding to a portion of the support SUP in which the hole HO is defined may be calculated using the first angle θ1 and the second angle θ2. Referring to FIG. 8C, in the end part SUP-E of the support SUP in which the hole HO is not defined, the first angle θ1 may correspond to zero. Using this, the bending moment corresponding to the end part SUP-E may be calculated.

Specifically, the bending moment corresponding to the end part SUP-E and the bending moment corresponding to a portion of the support SUP in which the hole HO is defined may be respectively calculated using Equation 2 below.

$$I(\theta_1, \theta_2) = \frac{1}{4}\left[(R+d)^4 - R^4\right]\left[\theta_2 - \theta_1 + \frac{1}{2}(\sin\theta_2 - \sin\theta_1)\right] - \frac{4\left(\left[(R+d)^3 - R^3\right](\sin\theta_2 - \sin\theta_1)\right)^2}{9\left[(R+d)^2 - R^2\right](\theta_2 - \theta_1)}$$ [Equation 2]

In Equation 2, the reference symbol R is the radius of curvature R, and the reference symbol d is the thickness d of the support SUP. The reference symbol $\theta_1$ corresponds to the above-described first angle θ1, and the reference symbol $\theta_2$ corresponds to the above-described second angle θ2. A bending moment calculated through Equation 2 may be applied to Equation 1 and may be used to calculate the deflection of the support SUP.

FIGS. 9A to 9E are perspective views of an embodiment of a support according to the inventive concept. FIGS. 9A to 9E illustrate various embodiments of the hole HO defined in the support SUP, and the above description may be applied to the description of the support SUP except for the shape of the hole HO. Hereinafter, the differences between the embodiments will be mainly described.

Figure 9A:
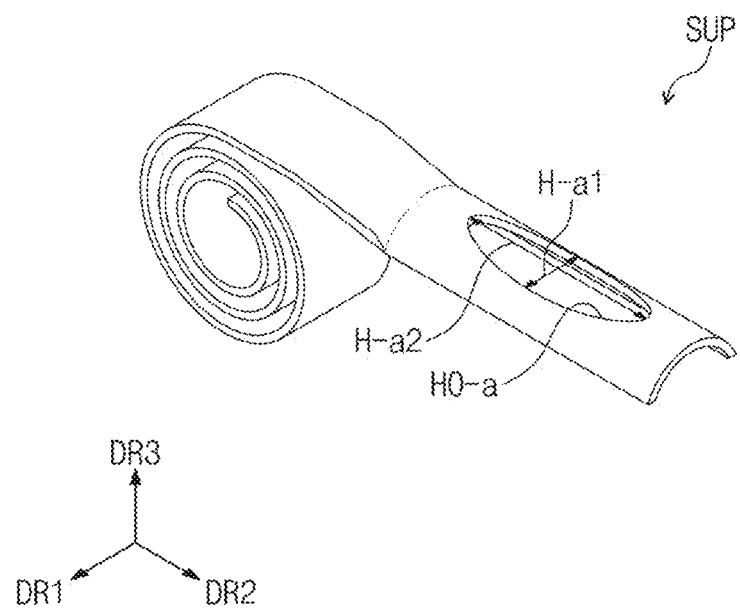
FIGS. 9A to 9E are perspective views of an embodiment of a support according to the inventive concept.

Referring to FIG. 9A, a hole HO-a may have an oval shape in a plan view. Specifically, the hole HO-a may have an oval shape having a long axis parallel to the second direction DR2 and a short axis parallel to the first direction DR1. A width H-a1 of the hole HO-a in the first direction DR1 may correspond to the short-axis length of the oval, and a length H-a2 of the hole HO-a in the second direction DR2 may correspond to the long-axis length of the oval. Accordingly, the length H-a2 of the hole HO-a in the second direction DR2 may be greater than the width H-a1 in the first direction DR1.

Although FIG. 9A illustrates one hole HO-a by way of example, the hole may be provided in plural as illustrated in FIGS. 9B to 9E, and the plurality of holes may be spaced apart from each other along one direction.

Figure 9B:
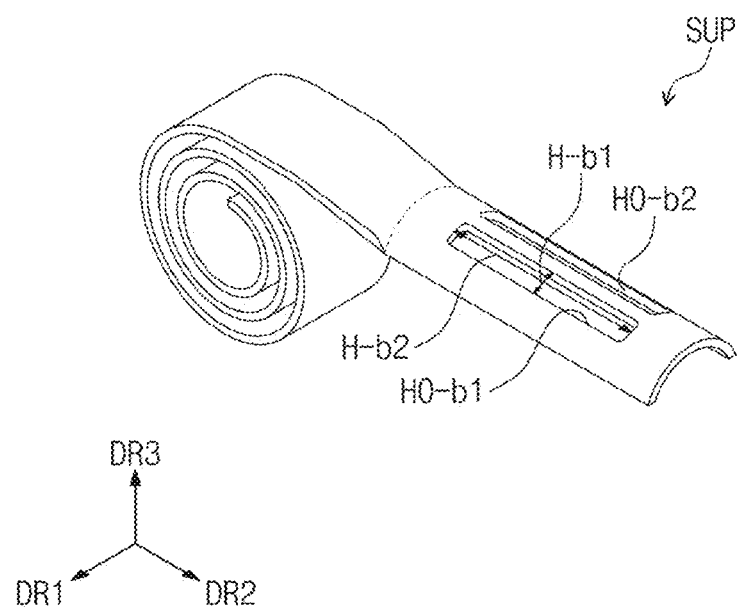

Referring to FIG. 9B, each of a plurality of holes HO-b1 and HO-b2 may extend along the second direction DR2, and the plurality of holes HO-b1 and HO-b2 may be spaced apart from each other in the first direction DR1. The plurality of holes HO-b1 and HO-b2 may be disposed side by side in the first direction DR1. However, the inventive concept is not limited thereto, and the plurality of holes HO-b1 and HO-b2 may be disposed in a staggered manner.

Widths H-b1 of the plurality of holes HO-b1 and HO-b2 in the first direction DR1 may be equal to each other, and lengths H-b2 of the plurality of holes HO-b1 and HO-b2 in the second direction DR2 may be equal to each other. However, the inventive concept is not limited thereto, and the lengths H-b2 of the plurality of holes HO-b1 and HO-b2 in the second direction DR2 may be equal to each other, but the widths H-b1 in the first direction DR1 may be different from each other. Each of the lengths H-b2 of the plurality of holes HO-b1 and HO-b2 in the second direction DR2 may be greater than the sum of the widths H-b1 of the plurality of holes HO-b1 and HO-b2 in the first direction DR1.

Figure 9C:
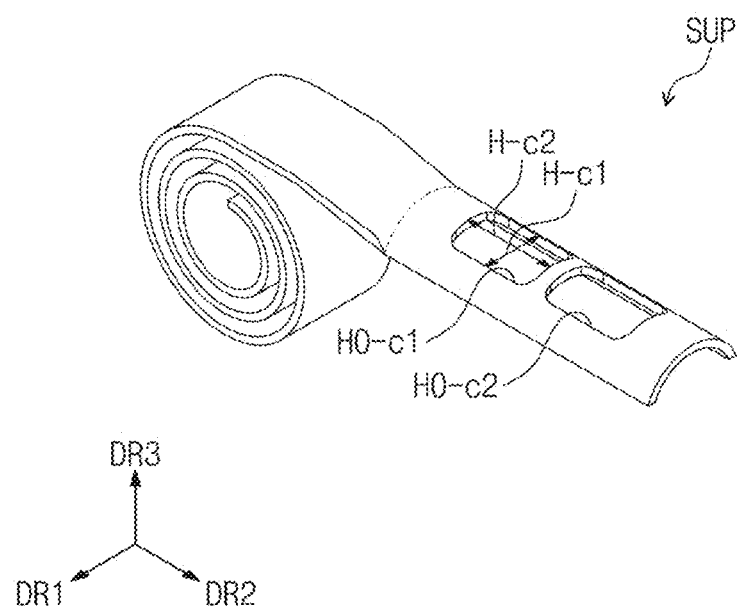

Referring to FIG. 9C, each of a plurality of holes HO-c1 and HO-c2 may extend along the second direction DR2, and the plurality of holes HO-c1 and HO-c2 may be spaced apart from each other in the second direction DR2. The plurality of holes HO-c1 and HO-c2 may be disposed side by side in the second direction DR2. However, the inventive concept is not limited thereto.

Widths H-c1 of the plurality of holes HO-c1 and HO-c2 in the first direction DR1 may be equal to each other, and lengths H-c2 of the plurality of holes HO-c1 and HO-c2 in the second direction DR2 may be equal to each other. However, the inventive concept is not limited thereto, and the widths H-c1 of the plurality of holes HO-c1 and HO-c2 in the first direction DR1 may be equal to each other, but the lengths H-c2 of the plurality of holes HO-c1 and HO-c2 in the second direction DR2 may be different from each other. The sum of the lengths H-c2 of the plurality of holes HO-c1 and HO-c2 in the second direction DR2 may be greater than each of the widths H-c1 of the plurality of holes HO-c1 and HO-c2 in the first direction DR1.

FIGS. 9B and 9C illustrates that each of the plurality of holes HO-b1, HO-b2, HO-c1, and HO-c2 has a quadrangular (e.g., rectangular) shape in a plan view, but the inventive concept is not limited thereto. In an embodiment, each of the plurality of holes HO-b1, HO-b2, HO-c1, and HO-c2 may have an oval shape in a plan view, for example.

Figure 9D:
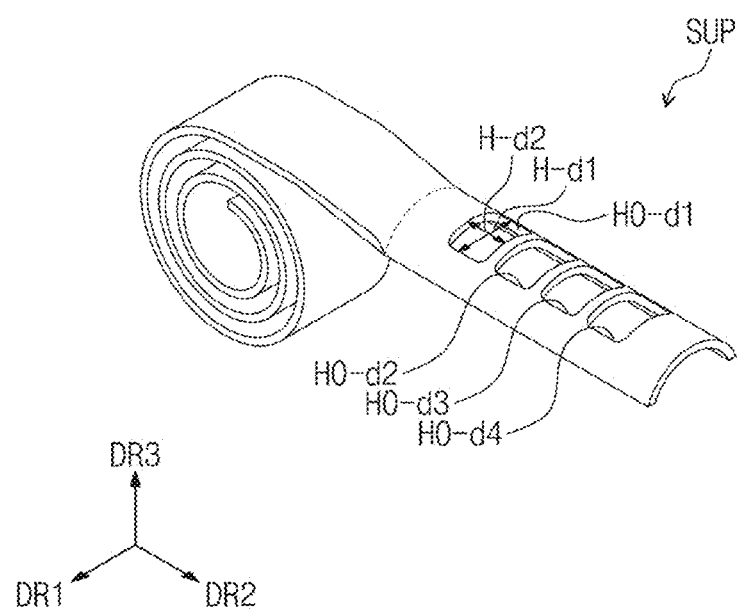

Referring to FIG. 9D, each of a plurality of holes HO-d1, HO-d2, HO-d3 and HO-d4 may extend along the first direction DR1, and the plurality of holes HO-d1, HO-d2, HO-d3, and HO-d4 may be spaced apart from each other in the second direction DR2. The plurality of holes HO-d1, HO-d2, HO-d3, and HO-d4 may be disposed side by side in the second direction DR2, but the inventive concept is not limited thereto.

Widths H-d1 of the plurality of holes HO-d1, HO-d2, HO-d3, and HO-d4 in the first direction DR1 may be equal to each other, and widths H-d2 of the plurality of holes HO-d1, HO-d2, HO-d3, and HO-d4 in the second direction DR2 may be equal to each other. However, the inventive concept is not limited thereto, and the widths H-d1 of the plurality of holes HO-d1, HO-d2, HO-d3, and HO-d4 in the first direction DR1 may be equal to each other, but lengths H-d2 of the plurality of holes HO-d1, HO-d2, HO-d3, and HO-d4 in the second direction DR2 may be different from each other. The sum of the lengths H-d2 of the plurality of holes HO-d1, HO-d2, Ho-d3, and HO-d4 in the second direction DR2 may be greater than each of the widths H-d1 of the plurality of holes HO-d1, HO-d2, HO-d3, and HO-d4 in the first direction DR1.

Figure 9E:
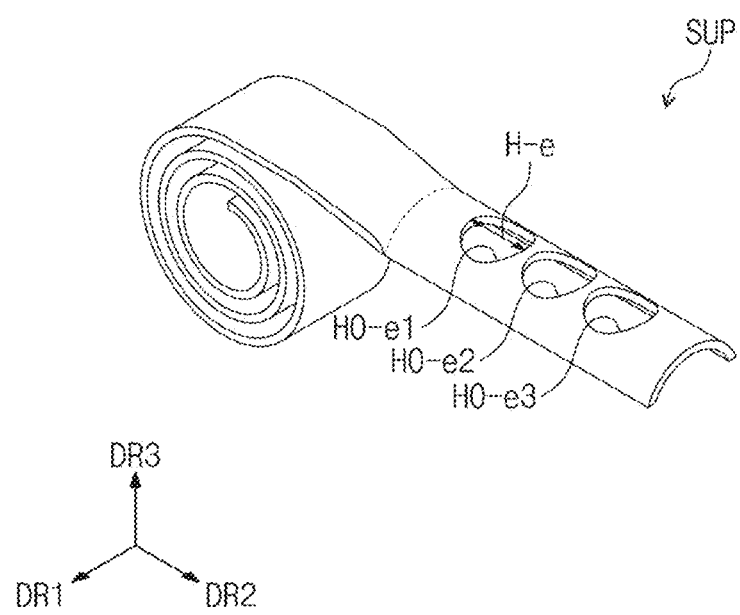

Referring to FIG. 9E, a plurality of holes HO-e1, HO-e2, and HO-e3 may be spaced apart from each other along the second direction DR2. Each of the plurality of holes HO-e1, HO-e2, and HO-e3 may have a circular shape in a plan view. Lengths H-e of the plurality of holes HO-e1, HO-e2, and HO-e3 in the second direction DR2 may respectively correspond to the diameters of circles. The lengths H-e of the plurality of holes HO-e1, HO-e2, and HO-e3 in the second direction DR2 may be equal to each other. However, the inventive concept is not limited thereto, and at least some of the plurality of holes HO-e1, HO-e2, and HO-e3 may have different lengths H-e in the second direction DR2.

The sum of the lengths of the plurality of holes in the second direction DR2 may be about 30% or less of the length L (refer to FIG. 8A) of the support SUP. As the sum of the lengths of the holes in the second direction DR2 decreases, the support force of the support SUP may increase, but the size of the transition region of the support SUP may also increase. As the sum of lengths of the holes increases in the second direction DR2, the size of the transition region of the support SUP may decrease, but the support force of the support SUP may also decrease. Accordingly, by adjusting the sizes of the holes, the support SUP may have a predetermined support force and the transition region of the support SUP may be minimized.

FIGS. 9B to 9E illustrate that the plurality of holes has the same size as each other, but the inventive concept is not limited thereto, and at least some of the plurality of holes may have different sizes. In addition, the shape, arrangement, number, etc., of the holes illustrated in FIGS. 9A to 9E are merely one of embodiments and are not limited to the illustrated embodiments.

Figure 10:
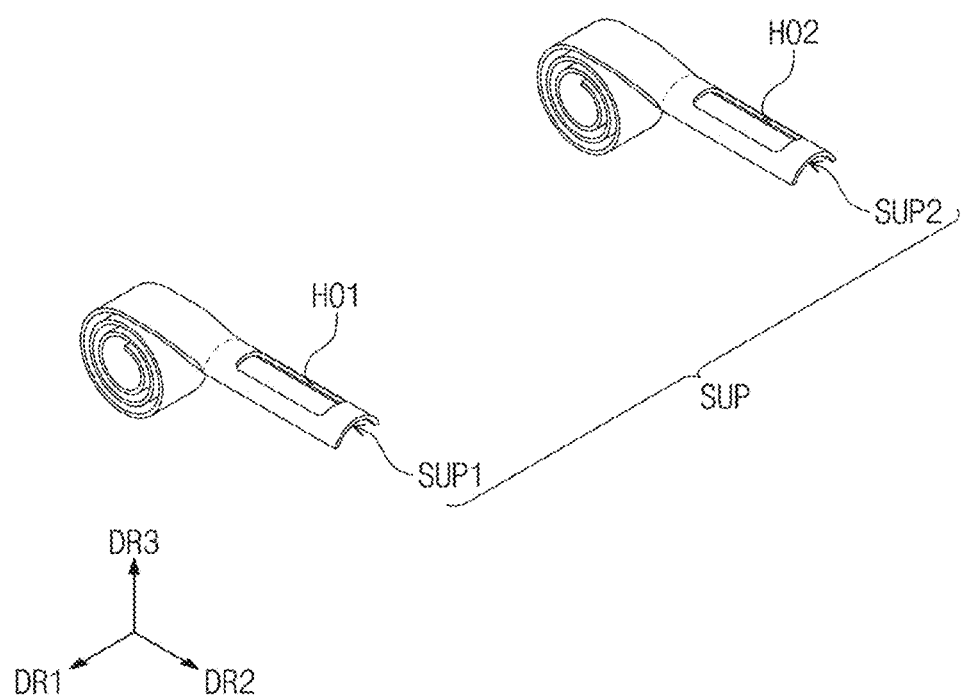
FIG. 10 is a perspective view of an embodiment of a support according to the inventive concept.

FIG. 10 is a perspective view of an embodiment of a support according to the inventive concept. Referring to FIG. 10, the support SUP may be provided in plural in one display apparatus DD or DD-1 (refer to FIG. 1B or FIG. 2B). FIG. 10 illustrates a first support SUP1 and a second support SUP2. However, the number of supports included in one display apparatus DD or DD-1 (refer to FIG. 1B or FIG. 2B) is not limited thereto.

For each of the first support SUP1 and the second support SUP2, the above-described description of the support SUP may be equally applied. Each of the first support SUP1 and the second support SUP2 may be provided as a BRC structure. One end of the first support SUP1 and one end of the second support SUP2 that are oriented toward the second direction DR2 may be convex upward. That is, one end of the first support SUP1 and one end of the second support SUP2 may be convex toward the display module DM (refer to FIG. 5B) disposed on the supports SUP1 and SUP2.

A first hole HO1 may be defined in the first support SUP1 and a second hole HO2 may be defined in the second support SUP2. The first hole HO1 and the second hole HO2 may have the same shape, size, and number. However, the inventive concept is not limited thereto.

Each of the first support SUP1 and the second support SUP2 may be rolled about a rolling axis extending along the first direction DR1. The first support SUP1 and the second support SUP2 may be connected to the same roller (e.g., the second roller ROL2 of FIG. 5A) and may be driven together. However, the inventive concept is not limited thereto, and the first support SUP1 and the second support SUP2 may be connected to different rollers and driven independently.

The first support SUP1 and the second support SUP2 may be spaced apart from each other along the first direction DR1. The first support SUP1 may stably support one side of the display module DM (refer to FIG. 5B) parallel to the second direction DR2, and the second support SUP2 may stably support the other side of the display module DM (refer to FIG. 5B) which is parallel to the second direction DR2 and which is opposite to the one side in the first direction DR1. An arrangement form of the first support SUP1 and the second support SUP2 is not limited to any one as long as the support may stably support the display module DM.

Figure 11A:
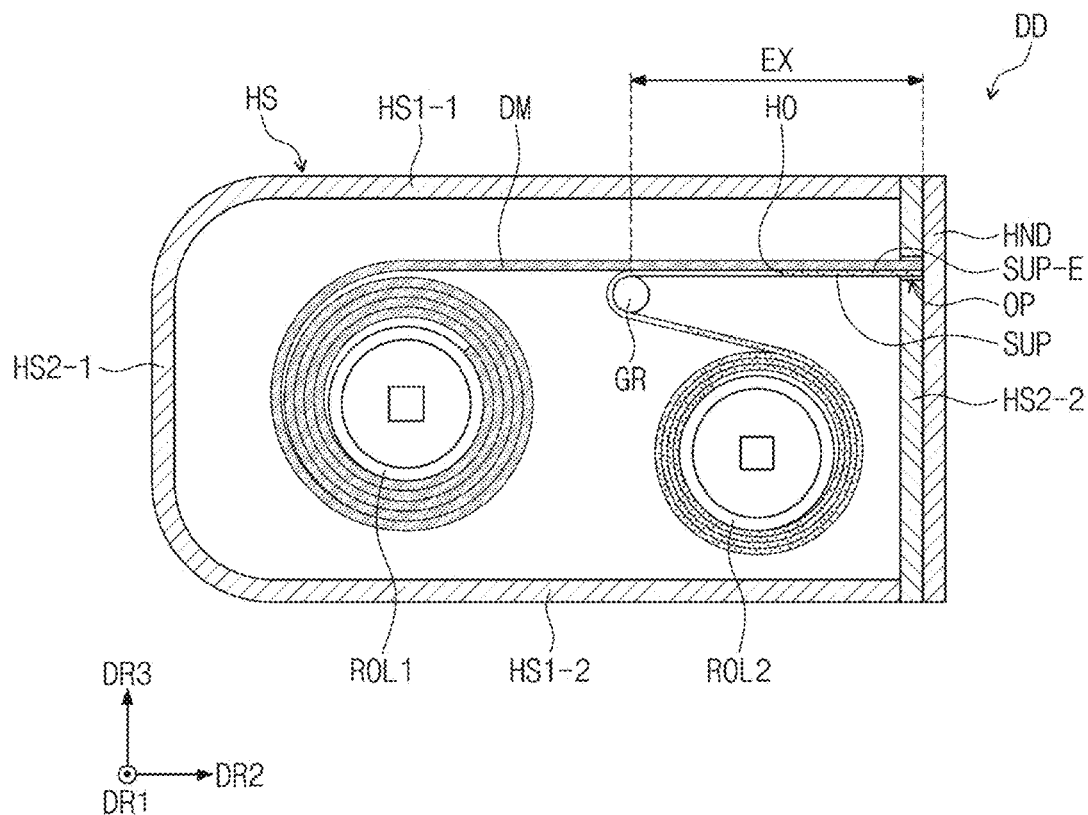
FIGS. 11A and 11B are cross-sectional views of an embodiment of a display apparatus according to the inventive concept.
Figure 11B:
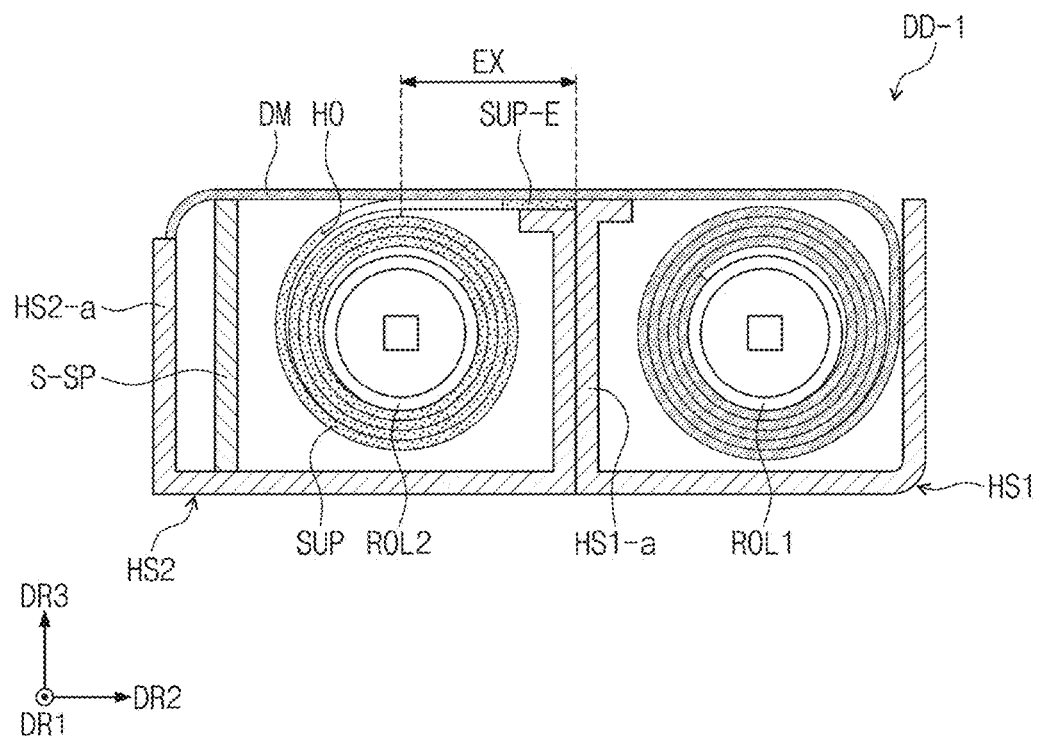

FIGS. 11A and 11B are cross-sectional views of a display apparatus. FIG. 11A illustrates a cross-sectional view of a display apparatus DD of FIG. 1A, and FIG. 11B illustrates a cross-sectional view of a display apparatus DD-1 of FIG. 2A. With regard to each configuration, the above description may be applied.

Referring to FIG. 11A, the support SUP may be wound on the second roller ROL2 and accommodated in the housing HS. The stably rolled support SUP may include an unrolled portion EX. The end part SUP-E of the support SUP may be a portion of the unrolled portion EX. The end part SUP-E may be connected to the handle HND through the opening OP of the second side surface HS2-2 of the housing HS. The unrolled portion EX may be accommodated in the housing HS to support the rear surface of the display module DM.

The support SUP may be provided as a BRC structure. Accordingly, the support SUP may have a transition region that is an intermediate state between the first stable state and the second stable state as described above. Since the rolled support SUP includes the unrolled portion EX, the first stable state and the second stable state may be balanced. That is, since the support SUP includes the unrolled portion EX, a portion of the support SUP may be stably wound on the second roller ROL2 and the end part SUP-E of the support SUP may stably support the display module DM. When the support SUP does not include the unrolled portion EX, the support SUP may push the handle HND due to the rigidity of the support SUP which is to be unrolled in the second direction DR2.

When the hole HO is not defined in the support SUP, the size of the unrolled portion EX desired to stably maintain the rolled support SUP may be increased compared to that illustrated in FIG. 11A. Accordingly, the size of the housing HS for accommodating the support SUP may also be increased. Accordingly, the dead space of the display apparatus DD increases and the size of the display apparatus DD increases, so that it is difficult to provide the display apparatus DD having a compact size.

However, since the hole HO adjacent to the end part SUP-E is defined in the support SUP in an embodiment of the inventive concept, the rigidity of the support SUP to be unrolled in the second direction DR2 may be lowered. Accordingly, the size of the unrolled portion EX of the stably rolled support SUP may be reduced. When the size of the unrolled portion EX is reduced, an internal space of the housing HS desired to accommodate the stably rolled support SUP may be reduced, and the size of the display apparatus DD may be reduced. Accordingly, the display apparatus DD designed in a compact size may be provided.

Referring to FIG. 11B, the support SUP may be wound on the second roller ROL2 and may be accommodated in the second housing HS2. The stably rolled support SUP may include an unrolled portion EX, and the end part SUP-E of the support SUP may be a portion of the unrolled portion EX. The end part SUP-E may be connected to the first side surface part HS1-a of the first housing HS1. The unrolled portion EX may be accommodated in the second housing HS2 to support the rear surface of the display module DM.

The display apparatus DD-1 may further include a sub support member S-SP that is fixed inside the second housing HS2 to support the rear surface of the display module DM. The sub support member S-SP may be spaced apart from the support SUP to assist in supporting the display module DM. The shape of the sub support member S-SP is not limited to any one as long as the sub support member S-SP may support the rear surface of the display module DM disposed on the second housing HS2.

Like an embodiment illustrated in FIG. 11A, the support SUP of FIG. 11B may be provided as a BRC structure, and the rolled support SUP may include the unrolled portion EX, so that the first stable state and the second stable state, described above, may be balanced. When the support SUP does not include the unrolled portion EX, the second housing HS2 may move in a direction away from the first housing HS1 regardless of a user's motion due to the rigidity of the support SUP which is to be unrolled in the second direction DR2.

When the hole HO is not defined in the support SUP, the size of the unrolled portion EX may be increased compared to that illustrated in FIG. 11B in order to stably maintain the rolled support SUP. Accordingly, the size of the second housing HS2 for accommodating the support SUP and the dead space of the display apparatus DD-1 may increase.

However, since the hole HO adjacent to the end part SUP-E is defined in the support SUP in an embodiment of the inventive concept, the rigidity of the support SUP that is to be unrolled in the second direction DR2 may be lowered. Accordingly, the size of the unrolled portion EX of the stably rolled support SUP may be reduced, and an internal space of the second housing HS2 desired to accommodate the stably rolled support SUP may be reduced. Accordingly, the size of the display apparatus DD-1 may be reduced.

A support in an embodiment of the inventive concept may be provided as a BRC structure, and may be wound or unwound on a separate roller distinct from a roller connected to a display panel. As a hole adjacent to one end of the support in an embodiment is defined, the support may be provided as the BRC structure in which the size of the transition region is reduced while stably supporting the display panel on the rear surface of the display panel. Accordingly, the transition region of the support wound on the roller may be minimized, and the accommodation space desired for accommodating the support wound on the roller may be reduced. Accordingly, a dead space of the display apparatus may be reduced, and the display apparatus having a compact size may be provided.

According to the inventive concept, a support is provided as a BRC having holes, so that a display panel may be wound to have a minimized dead space when the display panel is wound, and the display panel may be stably supported when the display panel is unwound.

Although the embodiments of the invention have been described, it is understood that the invention should not be limited to these embodiments but various changes and modifications may be made by one ordinary skilled in the art within the spirit and scope of the invention as hereinafter claimed.

What is claimed is:

1. A display apparatus comprising:
    a first roller and a second roller each rolling about a rolling axis extending along a first direction and spaced apart from each other in a second direction crossing the first direction;
    a display panel connected to the first roller; and
    a support which is connected to the second roller and disposed on a rear surface of the display panel and supports the display panel and through which at least one hole passing through the support is defined, the support comprising:
        an end part surrounding a portion of the at least one hole, extending along the first direction and convex toward the display panel in a cross section; and
        a side part extending along the second direction from the end part,
    wherein the at least one hole is provided in single in the second direction, and a length of the hole in the second direction is about 30% or less of a length of the support in the second direction, or
    wherein the at least one hole is provided in plural in the second direction so that a plurality of holes is spaced apart from each other along the second direction, and a sum of lengths of the plurality of holes in the second direction is about 30% or less of the length of the support in the second direction.

2. The display apparatus of claim 1, wherein the length of the hole in the second direction is greater than a width of the hole in the first direction.

3. The display apparatus of claim 1, wherein the sum of lengths of the plurality of holes in the second direction is greater than a width of each of the plurality of holes in the first direction.

4. The display apparatus of claim 1, wherein the plurality of holes is spaced apart from each other along the first direction.

5. The display apparatus of claim 4, wherein a length of each of the plurality of holes in the second direction is greater than a sum of widths of the plurality of holes in the first direction.

6. The display apparatus of claim 1, wherein the hole has a circular, oval, or quadrangular shape in a plan view.

7. The display apparatus of claim 1, wherein in a state in which the display panel is wound on the first roller, the end part supports the display panel, and at least a portion of the side part is wound on the second roller.

8. The display apparatus of claim 1, wherein in a state in which the display panel is unwound from the first roller, the support supports an unwound portion of the display panel.

9. The display apparatus of claim 1, wherein the support is a bistable reeled composite.

10. The display apparatus of claim 1, wherein the support is provided in plural, and
    a plurality of supports is spaced apart from each other along the first direction.

11. The display apparatus of claim 1, wherein a rotation direction of the first roller which unwinds the display panel and a rotation direction of the second roller which unwinds the support are opposed to each other.

12. A display apparatus comprising:
    a display panel rolled about a first rolling axis extending along a first direction;
    a guide roller extending in the first direction; and
    a support rolled about a second rolling axis extending along the first direction and spaced apart from the first rolling axis,
    wherein a hole passing through the support is defined in the support, the hole is adjacent to an end of the support extending along the first direction, and the support is a bistable reeled composite,
    wherein, the at least one hole is provided in single in the second direction, and a length of the hole in the second direction is about 30% or less of a length of the support in the second direction, or
    wherein, the at least one hole is provided in plural in the second direction so that a plurality of holes is spaced apart from each other along the second direction, and a sum of lengths of the plurality of holes in the second direction is about 30% or less of the length of the support in the second direction.

13. The display apparatus of claim 12, wherein a first portion of the support wound about the second rolling axis is flat along the first direction, and
    a second portion of the support which is unwound about the second rolling axis and extends along a second direction crossing the first direction is convex toward the display panel.

14. The display apparatus of claim 13, wherein the length of the hole in the second direction is greater than a width of the hole in the first direction.

15. The display apparatus of claim 12, wherein a rotation direction of the display panel rolled about the first rolling axis and a rotation direction of the support rolled about the second rolling axis are opposed to each other.

* * * * *